(12) United States Patent
Hayakawa et al.

(10) Patent No.: US 10,762,787 B2
(45) Date of Patent: Sep. 1, 2020

(54) COMMUNICATION DEVICE, COMMUNICATION SYSTEM, COMMUNICATION PROGRAM, AND COMMUNICATION CONTROL METHOD

(71) Applicant: Sumitomo Electric Industries, Ltd., Osaka-shi (JP)

(72) Inventors: Jun Hayakawa, Osaka (JP); Akira Suwa, Osaka (JP); Susumu Takeshima, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/311,246

(22) PCT Filed: May 1, 2017

(86) PCT No.: PCT/JP2017/017178
§ 371 (c)(1),
(2) Date: Dec. 19, 2018

(87) PCT Pub. No.: WO2018/003285
PCT Pub. Date: Jan. 4, 2018

(65) Prior Publication Data
US 2019/0236957 A1    Aug. 1, 2019

(30) Foreign Application Priority Data
Jun. 30, 2016    (JP) .................. 2016-130730

(51) Int. Cl.
*G08G 1/16*    (2006.01)
*G08G 1/09*    (2006.01)
(Continued)

(52) U.S. Cl.
CPC ........... *G08G 1/166* (2013.01); *G08G 1/0112* (2013.01); *G08G 1/09* (2013.01);
(Continued)

(58) Field of Classification Search
CPC .......... G08G 1/0112; G08G 1/096708; G08G 1/166; G08G 1/096741; G08G 1/096791;
(Continued)

(56) References Cited

U.S. PATENT DOCUMENTS 6,088,699 A *    7/2000  Gampper ............... H03M 7/30
9,953,436 B2 *   4/2018  Li ............................ G06T 9/00
(Continued)

FOREIGN PATENT DOCUMENTS

EP    1 677 271 A1    7/2006
GB    2491291 A       11/2012
(Continued)

OTHER PUBLICATIONS

Liu et al., "Deep Sparse Autoencode: Visualization of driving behavior using Deep Sparse Autoencoder," The 28th Annual Conference of the Japanese Society for Artificial Intelligence, 2014, [online], [searched on May 6, 2016], Internet, <URL: https://kaigi.org.jsai/webprogram/2014/pdf/210.pdf> [Cited in Spec].
(Continued)

*Primary Examiner* — Christopher Biagini
(74) *Attorney, Agent, or Firm* — Baker Botts L.L.P.; Michael A. Sartori

(57) ABSTRACT

Provided is a communication apparatus installed in a vehicle, the communication apparatus including: an acquisition unit configured to acquire, via a network installed in the vehicle, a plurality of types of status information each indicating a status of the vehicle; an information creation unit configured to create, on the basis of each piece of the status information acquired by the acquisition unit, feature information having a data amount smaller than a total of data amounts of the respective pieces of the status information, the feature information including a feature amount of a traveling status of the vehicle; and a transmission unit
(Continued)

301 configured to transmit vehicle information based on the feature information created by the information creation unit, to another communication apparatus.

11 Claims, 19 Drawing Sheets

(51) Int. Cl.
*H04W 4/46* (2018.01)
*G08G 1/01* (2006.01)
*G08G 1/0967* (2006.01)

(52) U.S. Cl.
CPC ......... *G08G 1/096708* (2013.01); *G08G 1/16* (2013.01); *H04W 4/46* (2018.02)

(58) Field of Classification Search
CPC .......... G08G 1/16; G08G 1/161; G08G 1/163; G08G 1/164; G08G 1/167; G08G 1/20; G08G 1/205; H04W 4/46; H04W 4/027; H04W 4/40; H04W 4/44; H04W 64/006; H04W 76/40; B60W 30/08; B60W 30/09; B60W 30/16; B60W 50/14
See application file for complete search history.

(56) References Cited

U.S. PATENT DOCUMENTS

| | | | |
|---|---|---|---|
| 2011/0184605 A1* | 7/2011 | Neff | G05D 1/0231 |
| | | | 701/25 |
| 2017/0063392 A1* | 3/2017 | Kalevo | H04N 19/91 |
| 2017/0240158 A1* | 8/2017 | Yamaguchi | G07C 5/0825 |

FOREIGN PATENT DOCUMENTS

| | | | |
|---|---|---|---|
| JP | 2005-149465 A | 6/2005 | |
| JP | 2008-294721 A | 12/2008 | |
| JP | 2009-003822 A | 1/2009 | |
| JP | 2011-201336 A | 10/2011 | |
| JP | 2015-028742 A | 2/2015 | |
| JP | 2016-045861 A | 4/2016 | |

OTHER PUBLICATIONS

ITS Info-Communications Forum, "700 MHz Band Intelligent Transport Systems Experimental Guideline for Inter-vehicle Communication Messages Its Forum RC-013 ver. 1.0" 2014, 99 pages [online] [searched on Jun. 6, 2016], Internet <URL: www.itsforum.gr.jp/Public/J7Database/p48/ITS_FORUM_RC-013_v10.pdf> [Cited in Spec].

* cited by examiner

| FIELD | DATA STRUCTURE | STORED DF | SIZE (bytes) | | REMARKS |
|---|---|---|---|---|---|
| COMMON FIELD | COMMON APPLICATION HEADER FIELD | DF_COMMON FIELD MANAGEMENT INFORMATION | | 8 | STORAGE IS MANDATORY. |
| | COMMON APPLICATION DATA FIELD | DF_TIME INFORMATION | 4 | 28 | STORAGE IS MANDATORY. IF NO PROPER VALUE IS AVAILABLE, SET THE "UNAVAILABLE" VALUE. |
| | | DF_POSITION INFORMATION | 11 | | |
| | | DF_VEHICLE STATUS INFORMATION | 9 | | |
| | | DF_VEHICLE ATTRIBUTE INFORMATION | 4 | | |
| | | DF_POSITION OPTIONAL INFORMATION (*) | 2 | 0~26 | STORAGE IS OPTIONAL. STORING SEQUENCE MAY NOT BE CHANGED. |
| | | DF_GPS STATUS OPTIONAL INFORMATION (*) | 4 | | |
| | | DF_POSITION ACQUISITION OPTIONAL INFORMATION (*) | 2 | | |
| | | DF_VEHICLE STATUS OPTIONAL INFORMATION (*) | 7 | | |
| | | DF_INTERSECTION INFORMATION (*) | 10 | | |
| | | DF_EXTENDED INFORMATION (*) | 1 | | |
| FREE FIELD | FREE APPLICATION HEADER FIELD | DF_FREE FIELD MANAGEMENT INFORMATION | 0~1 | 0~22 | STORAGE IS OPTIONAL. SIZE DEPENDS ON NUMBER OF INDIVIDUAL APPLICATION DATA SET. |
| | | DF_INDIVIDUAL APP DATA MANAGEMENT INFORMATION SET | 0~21 | | |
| | FREE APPLICATION DATA FIELD | (NOT SPECIFIED) | | 0~60 | STORAGE IS OPTIONAL. STORING SEQUENCE AS SPECIFIED BY DF_INDIVIDUAL APP DATA MANAGEMENT INFORMATION SET. |
| | | | TOTAL 36 to 100 | | |

(*): OPTIONAL INFORMATION

| FLAG VALUE | BEHAVIOR OF VEHICLE 1 |
|---|---|
| 0 | TRAVELING AT HIGH SPEED |
| 1 | ACCELERATING |
| 2 | DECELERATING |
| 3 | TURNING RIGHT |
| 4 | TURNING LEFT |
| 5 | DECELERATING BEFORE TURNING LEFT |
| 6 | DECELERATING BEFORE TURNING RIGHT |
| ⋮ | ⋮ |

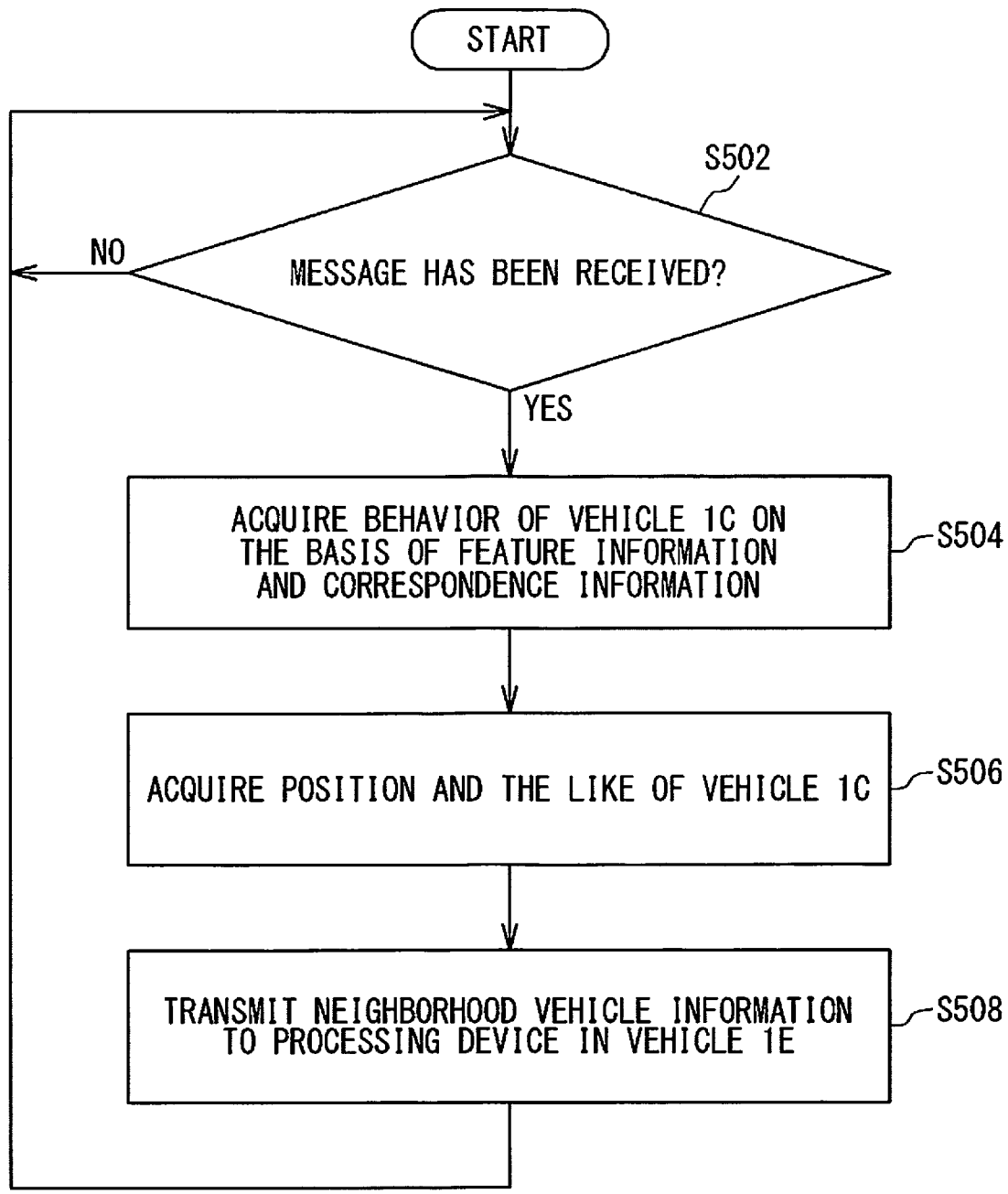

COMMUNICATION DEVICE, COMMUNICATION SYSTEM, COMMUNICATION PROGRAM, AND COMMUNICATION CONTROL METHOD

TECHNICAL FIELD

The present invention relates to a communication apparatus, a communication system, a communication program, and a communication control method. This application claims priority on Japanese Patent Application No. 2016-130730 filed on Jun. 30, 2016, the entire content of which is incorporated herein by reference.

BACKGROUND ART

PATENT LITERATURE 1 (Japanese Laid-Open Patent Publication No. 2009-3822) discloses a vehicle-to-vehicle communication device below. That is, the vehicle-to-vehicle communication device has a plurality of wireless communication means for performing wireless data communication with another vehicle. The vehicle-to-vehicle communication device includes at least: a vehicle-to-vehicle communication control means for individually controlling communication of the respective wireless communication means; a display means for outputting and displaying data received by each wireless communication means; an input means for inputting operation settings; a travel information acquisition means for acquiring travel information which is information acquired with respect to travel of the own vehicle; and a control means for controlling the vehicle-to-vehicle communication control means such that the travel information or transmission information created on the basis of the travel information is transmitted from the wireless communication means. In the vehicle-to-vehicle communication device, on the basis of the positions at which the plurality of wireless communication means are installed in the vehicle, transmission frequency of the travel information or the transmission information is changed.

CITATION LIST

Patent Literature

PATENT LITERATURE 1: Japanese Laid-Open Patent Publication No. 2009-3822

Non Patent Literature

NON PATENT LITERATURE 1: The 28th Annual Conference of the Japanese Society for Artificial Intelligence, 2014, "Visualization of vehicle driving state by Deep Sparse Autoencoder" [online], [searched on May 6, 2016], Internet, <URL:https://kaigi.org/jsai/webprogram/2014/pdf/210.pdf>

NON PATENT LITERATURE 2: ITS Info-communications Forum, "700 MHz BAND INTELLIGENT TRANSPORT SYSTEMS Experimental Guideline for Inter-vehicle Communication Messages ITS FORUM RC-013 ver. 1.0" [online] [searched on Jun. 6, 2016], Internet <URL:www.its-forum.grjp/Public/J7Database/p48/ITS_FORUM_RC-013_v10.pdf>

SUMMARY OF INVENTION

Solution to Problem (1) A communication apparatus of the present disclosure is a communication apparatus installed in a vehicle, the communication apparatus including: an acquisition unit configured to acquire, via a network installed in the vehicle, a plurality of types of status information each indicating a status of the vehicle; an information creation unit configured to create, on the basis of each piece of the status information acquired by the acquisition unit, feature information having a data amount smaller than a total of data amounts of the respective pieces of the status information, the feature information including a feature amount of a traveling status of the vehicle; and a transmission unit configured to transmit vehicle information based on the feature information created by the information creation unit, to another communication apparatus.

(7) A communication apparatus of the present disclosure is a communication apparatus installed in a vehicle, the communication apparatus including: a reception unit configured to receive feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and a determination unit configured to determine a traveling status of the vehicle on the basis of the feature information and the correspondence information received by the reception unit.

(8) A communication system of the present disclosure is a communication system including: a first communication apparatus installed in a vehicle, the first communication apparatus configured to transmit vehicle information based on feature information created on the basis of a plurality of types of status information each indicating a status of the vehicle, the feature information having a data amount smaller than a total of data amounts of the respective pieces of the status information, the feature information including a feature amount of a traveling status of the vehicle; and a second communication apparatus configured to receive the vehicle information transmitted by the first communication apparatus.

(9) A communication program of the present disclosure is a communication program to be used in a communication apparatus installed in a vehicle, the communication program causing a computer to function as: an acquisition unit configured to acquire, via a network installed in the vehicle, a plurality of types of status information each indicating a status of the vehicle; an information creation unit configured to create, on the basis of each piece of the status information acquired by the acquisition unit, feature information having a data amount smaller than a total of data amounts of the respective pieces of the status information, the feature information including a feature amount of a traveling status of the vehicle; and a transmission unit configured to transmit vehicle information based on the feature information created by the information creation unit, to another communication apparatus.

(10) A communication program of the present disclosure is a communication program to be used in a communication apparatus installed in a vehicle, the communication program causing a computer to function as: a reception unit configured to receive feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and a determination unit configured to determine a traveling status of the vehicle on the basis of the feature information and the correspondence information received by the reception unit.

(11) A communication control method of the present disclosure is a communication control method to be used in a communication apparatus installed in a vehicle, the communication control method including the steps of: acquiring, via a network installed in the vehicle, a plurality of types of status information each indicating a status of the vehicle; creating, on the basis of each piece of the acquired status information, feature information having a data amount smaller than a total of data amounts of the respective pieces of the status information, the feature information including a feature amount of a traveling status of the vehicle; and transmitting vehicle information based on the created feature information to another communication apparatus.

(12) A communication control method of the present disclosure is a communication control method to be used in a communication apparatus installed in a vehicle, the communication control method including the steps of: receiving feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and determining a traveling status of the vehicle on the basis of the feature information and the correspondence information that have been received.

One mode of the present disclosure can be realized not only as a communication apparatus including such characteristic processing units, but also as a semiconductor integrated circuit which realizes part or all of the communication apparatus.

In addition, one mode of the present disclosure can be realized not only as a communication system including such characteristic processing units, but also as a method that includes such characteristic processing steps, or can be realized as a semiconductor integrated circuit which realizes part or all of the communication system.

BRIEF DESCRIPTION OF DRAWINGS

FIG. 7 is a diagram showing one example of a message format to be used in the communication system according to the first embodiment of the present disclosure.

FIG. 19 is a flow chart describing an operation procedure according to which the second communication apparatus determines a traveling status of another vehicle on the basis of vehicle information and correspondence information according to the second embodiment of the present disclosure.

DESCRIPTION OF EMBODIMENTS

Figure 1:
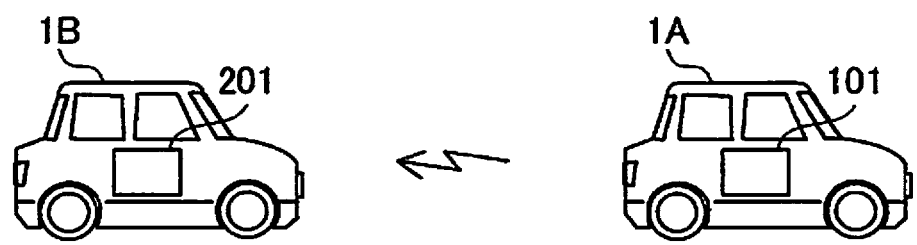
FIG. 1 is a diagram showing a configuration of a communication system according to a first embodiment of the present disclosure.

Conventionally, vehicle-to-vehicle communication systems for transmitting the status of own vehicle to vehicles traveling around the own vehicle have been developed.

Problems to be Solved by the Present Disclosure

Travel information acquired by a vehicle-to-vehicle communication device is information that indicates, for example, the traveling position, the speed, the acceleration, the engine rotation speed, the torque, the brake operation state, the accelerator opening state, and the like of the vehicle. When such vehicle information is transmitted without modification, to another vehicle, the amount of data transmitted in vehicle-to-vehicle communication increases, which could result in difficulty in communication. Meanwhile, when the vehicle-to-vehicle communication device receives travel information from a plurality of vehicles and performs an analyzing process of each piece of received travel information, the processing load of the analyzing process in the vehicle-to-vehicle communication device increases.

The present disclosure has been made in order to solve the above problem. An object of the present disclosure is to provide a communication apparatus, a communication system, a communication program, and a communication control method that can efficiently transmit the status of a vehicle to another vehicle.

Effect of the Disclosure

According to the present disclosure, the status of the vehicle can be efficiently transmitted to another vehicle.

Description of Embodiments of the Present Disclosure

First, contents of embodiments of the present disclosure are listed and described.

(1) A communication apparatus according to an embodiment of the present disclosure is a communication apparatus installed in a vehicle, the communication apparatus including: an acquisition unit configured to acquire, via a network installed in the vehicle, a plurality of types of status information each indicating a status of the vehicle; an information creation unit configured to create, on the basis of each piece of the status information acquired by the acquisition unit, feature information having a data amount smaller than a total of data amounts of the respective pieces of the status information, the feature information including a feature amount of a traveling status of the vehicle; and a transmission unit configured to transmit vehicle information based on the feature information created by the information creation unit, to another communication apparatus.

Due to the configuration in which vehicle information based on feature information having a data amount smaller than the total of data amounts of the respective pieces of the status information is transmitted, the amount of data transmitted to vehicle-to-vehicle communication, for example, can be decreased when compared with a configuration in which pieces of status information are transmitted without modification, to another communication apparatus. Therefore, the status of the vehicle can be efficiently transmitted to another vehicle. Accordingly, occurrence of difficulty in communication can be prevented. In addition, the other communication apparatus can acquire the traveling status of the vehicle on the basis of the vehicle information without performing analysis of each piece of status information. Accordingly, for example, also when another communication apparatus receives vehicle information from a plurality of communication apparatuses, the processing load of the other communication apparatus can be reduced.

(2) Preferably, the feature information includes the feature amount of a smaller number of types than the number of types of the respective pieces of the status information acquired by the acquisition unit.

With this configuration, for example, feature information can be created on the basis of status information of types that are relevant to the traveling status of the vehicle, among pieces of status information acquired by the acquisition unit. Therefore, the data amount of the feature information can be effectively reduced.

(3) Preferably, the information creation unit creates the feature information by use of a calculation method capable of converting K types of information into less than K types of feature amount, where K is an integer not smaller than 2.

Due to the configuration using a calculation method capable of converting huge information into small information, such as Deep Learning or principal component analysis, for example, feature information having a smaller data amount can be efficiently created.

(4) Preferably, the information creation unit creates the vehicle information including a traveling status of the vehicle determined in accordance with a predetermined numeral value range in which the feature amount is included.

With this configuration, for example, even when the correspondence relationship between the feature amount and the traveling status of the vehicle varies for each type of the vehicle, a correct traveling status of the vehicle can be transmitted to another communication apparatus. In addition, for example, since the size of vehicle information can be made smaller than that of feature information because the traveling status of the vehicle is expressed in terms of a flag value, the amount of data transmitted in vehicle-to-vehicle communication or the like can be further decreased. In another communication apparatus, for example, also when the correspondence relationship between the numeral value range of the feature amount and the traveling status of the vehicle varies for each type of the vehicle, the traveling status of the vehicle can be easily and correctly acquired from the vehicle information.

(5) Preferably, the transmission unit transmits the feature information as the vehicle information and transmits correspondence information indicating a correspondence relationship between a numeral value range of the feature amount and a traveling status of the vehicle, to the other communication apparatus.

Thus, due to the configuration in which the feature amount included in the feature information is transmitted without modification, the degree of freedom of processing the feature amount in another communication apparatus can be enhanced. In addition, in another communication apparatus, the traveling status of the vehicle can be acquired from the feature information by use of the correspondence information.

(6) More preferably, the correspondence information is different for each type of the vehicle.

With this configuration, for example, even when the performance is different for each type of the vehicle, and the correspondence relationship between the numeral value range of the feature amount and the traveling status of the vehicle varies for each type of the vehicle, the traveling status of the vehicle can be correctly acquired from the feature information in another communication apparatus.

(7) A communication apparatus according to an embodiment of the present disclosure is a communication apparatus installed in a vehicle, the communication apparatus including: a reception unit configured to receive feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and a determination unit configured to determine a traveling status of the vehicle on the basis of the feature information and the correspondence information received by the reception unit.

Thus, due to the configuration in which feature information having a data amount smaller than the total of data amounts of the respective pieces of the status information is received, the amount of data transmitted in vehicle-to-vehicle communication, for example, can be decreased when compared with a configuration in which pieces of status information are received without modification. Accordingly, occurrence of difficulty in communication can be prevented. The communication apparatus can acquire the traveling status of the vehicle on the basis of the feature information and the correspondence information without performing analysis of each piece of status information. Accordingly, for example, also when the communication apparatus receives feature information and correspondence information from a plurality of other communication apparatuses, the processing load in the communication apparatus can be reduced. In the communication apparatus, for example, even in a case where the correspondence relationship between the numeral value range of the feature amount and the traveling status of the vehicle varies for each type of the vehicle, the traveling status of the vehicle can be easily and correctly acquired.

(8) A communication system according to an embodiment of the present disclosure is a communication system including: first communication apparatus installed in a vehicle, the first communication apparatus configured to transmit vehicle information based on feature information created on the basis of a plurality of types of status information each indicating a status of the vehicle, the feature information having a data amount smaller than a total of data amounts of the respective pieces of the status information, the feature information including a feature amount of a traveling status of the vehicle; and a second communication apparatus configured to receive the vehicle information transmitted by the first communication apparatus.

Thus, in the communication system, due to the configuration in which vehicle information based on feature information having a data amount smaller than the total of data amounts of the respective pieces of the status information is transmitted, the amount of data transmitted in vehicle-to-vehicle communication, for example, can be decreased when compared with a configuration in which pieces of status information are transmitted without modification. Therefore, the status of the vehicle can be efficiently transmitted from the first communication apparatus to the second communication apparatus. Accordingly, occurrence of difficulty in communication can be prevented. In addition, the second communication apparatus can acquire the traveling status of the vehicle on the basis of the vehicle information without performing analysis of each piece of status information. Accordingly, for example, also when the second communication apparatus receives vehicle information from a plurality of first communication apparatuses, the processing load in the second communication apparatus can be reduced.

(9) A communication program according to an embodiment of the present disclosure is a communication program to be used in a communication apparatus installed in a vehicle, the communication program causing a computer to function as: an acquisition unit configured to acquire, via a network installed in the vehicle, a plurality of types of status information each indicating a status of the vehicle; an information creation unit configured to create, on the basis of each piece of the status information acquired by the acquisition unit, feature information having a data amount smaller than a total of data amounts of the respective pieces of the status information, the feature information including a feature amount of a traveling status of the vehicle; and a transmission unit configured to transmit vehicle information based on the feature information created by the information creation unit, to another communication apparatus.

Thus, due to the configuration in which vehicle information based on feature information having a data amount smaller than the total of data amounts of the respective pieces of the status information is transmitted, the amount of data transmitted in vehicle-to-vehicle communication, for example, can be decreased when compared with a configuration in which pieces of status information are transmitted without modification to another communication apparatus. Therefore, the status of the vehicle can be efficiently transmitted to another vehicle. Accordingly, occurrence of difficulty in communication can be prevented. In addition, the other communication apparatus can acquire the traveling status of the vehicle on the basis of the vehicle information without performing analysis of each piece of status information. Accordingly, for example, also when another communication apparatus receives vehicle information from a plurality of communication apparatuses, the processing load in the other communication apparatus can be reduced.

(10) A communication program according to an embodiment of the present disclosure is a communication program to be used in a communication apparatus installed in a vehicle, the communication program causing a computer to function as: a reception unit configured to receive feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and a determination unit configured to determine a traveling status of the vehicle on the basis of the feature information and the correspondence information received by the reception unit.

Due to the configuration in which vehicle information based on feature information having a data amount smaller than the total of data amounts of the respective pieces of the status information is received, the amount of data transmitted in vehicle-to-vehicle communication, for example, can be decreased when compared with a configuration in which pieces of status information are received without modification. Therefore, the status of the vehicle can be efficiently transmitted to another vehicle. Accordingly, occurrence of difficulty in communication can be prevented. In addition, the communication apparatus can acquire the traveling status of the vehicle on the basis of the vehicle information without performing analysis of each piece of status information. Accordingly, for example, also when the communication apparatus receives vehicle information from a plurality of other communication apparatuses, the processing load in the communication apparatus can be reduced. In addition, in the communication apparatus, for example, even when the correspondence relationship between the numeral value range of the feature amount and the traveling status of the vehicle varies for each type of the vehicle, the traveling status of the vehicle can be easily and correctly acquired.

(11) A communication control method according to an embodiment of the present disclosure is a communication control method to be used in a communication apparatus installed in a vehicle, the communication control method including the steps of: acquiring, via a network installed in the vehicle, a plurality of types of status information each indicating a status of the vehicle; creating, on the basis of each piece of the acquired status information, feature information having a data amount smaller than a total of data amounts of the respective pieces of the status information, the feature information including a feature amount of a traveling status of the vehicle; and transmitting vehicle information based on the created feature information to another communication apparatus.

Due to the method in which vehicle information based on feature information having a data amount smaller than the total of data amounts of the respective pieces of the status information is transmitted, the amount of data transmitted in vehicle-to-vehicle communication, for example, can be decreased when compared with a method in which pieces of status information are transmitted without modification to another communication apparatus. Therefore, the status of the vehicle can be efficiently transmitted to another vehicle. Accordingly, occurrence of difficulty in communication can be prevented. The other communication apparatus can acquire the traveling status of the vehicle on the basis of the vehicle information without performing analysis of each piece of status information. Accordingly, for example, also when another communication apparatus receives vehicle information from a plurality of communication apparatuses, the processing load in the other communication apparatus can be reduced.

(12) A communication control method according to an embodiment of the present disclosure is a communication control method to be used in a communication apparatus installed in a vehicle, the communication control method including the steps of: receiving feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and determining a traveling status of the vehicle on the basis of the feature information and the correspondence information that have been received.

Due to the method in which feature information having a data amount smaller than the total of data amounts of the respective pieces of the status information is received, the amount of data transmitted in vehicle-to-vehicle communication, for example, can be decreased when compared with a method in which pieces of status information are received without modification. Therefore, the status of the vehicle can be efficiently transmitted to another vehicle. Accordingly, occurrence of difficulty in communication can be prevented. In addition, the communication apparatus can acquire the traveling status of the vehicle on the basis of the feature information and the correspondence information without performing analysis of each piece of status information. Accordingly, for example, also when the communication apparatus receives feature information and correspondence information from a plurality of other communication apparatuses, the processing load in the communication apparatus can be reduced. In addition, in the communication apparatus, for example, even when the correspondence relationship between the numeral value range of the feature amount and the traveling status of the vehicle varies for each type of the vehicle, the traveling status of the vehicle can be easily and correctly acquired.

In the following, embodiments of the present disclosure are described with reference to the drawings. In the drawings, the same or corresponding parts are denoted by the same reference signs, and will not be repeatedly described. At least some parts of the embodiments described below may be combined together as desired.

First Embodiment

[Configuration and Basic Operation]

FIG. 1 is a diagram showing a configuration of a communication system according to a first embodiment of the present disclosure.

With reference to FIG. 1, a communication system 301 includes a first communication apparatus 101 and a second communication apparatus 201. The communication system 301 may be configured to include two or more first communication apparatuses 101. The communication system 301 may be configured to include two or more second communication apparatuses 201.

The first communication apparatus 101 is, for example, an on-vehicle device such as a navigation device, or a wireless terminal device portable by a person, such as a tablet terminal or a smartphone, and is installed in a vehicle 1A which travels on roads.

The second communication apparatus 201 is, for example, an on-vehicle device such as a navigation device, or a wireless terminal device portable by a person, such as a tablet terminal or a smartphone. The second communication apparatus 201 is installed in a vehicle 1B which travels on roads, for example. Hereinafter, each vehicle 1A, 1B will also be referred to as vehicle 1. The second communication apparatus 201 may not be installed in the vehicle 1.

The first communication apparatus 101 can perform vehicle-to-vehicle communication with the second communication apparatus 201, through ITS (Intelligent Transport Systems) wireless communication, for example. More specifically, the first communication apparatus 101 can perform vehicle-to-vehicle communication with the second communication apparatus 201 by broadcasting a radio wave that contains various types of information.

Figure 2:
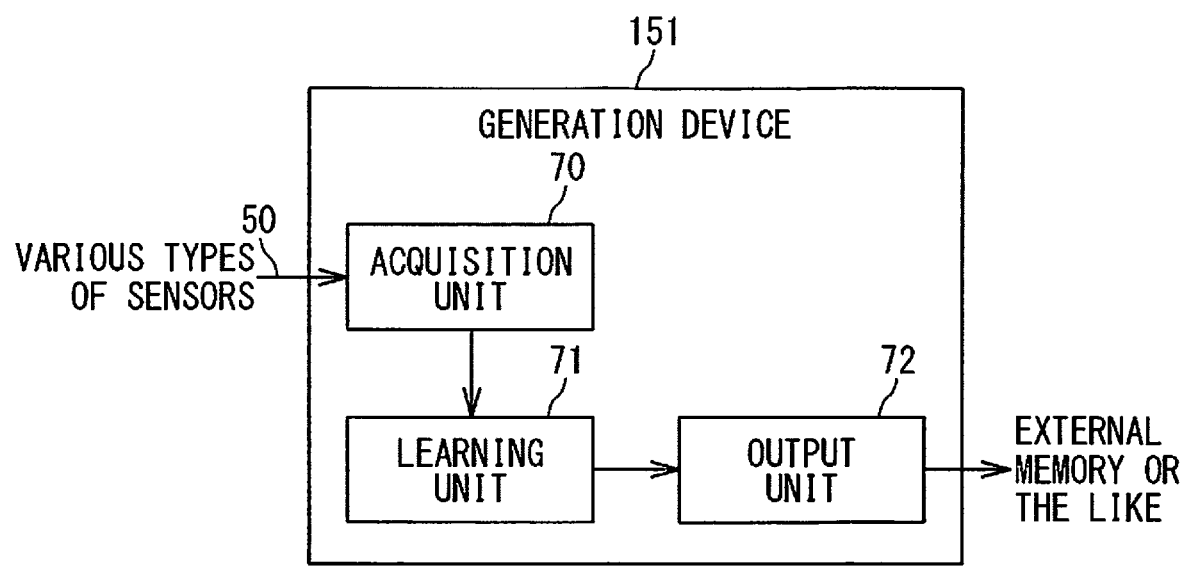
FIG. 2 is a diagram showing a configuration of a generation device according to the first embodiment of the present disclosure.

FIG. 2 is a diagram showing a configuration of a generation device according to the first embodiment of the present disclosure.

With reference to FIG. 2, a generation device 151 includes an acquisition unit 70, a learning unit 71, and an output unit 72.

The generation device 151 is installed in the vehicle 1, and generates a neural network for creating feature information including a feature amount of a traveling status of the vehicle 1.

Specifically, for example, the generation device 151 generates a neural network by use of Deep Learning described in NON PATENT LITERATURE 1 (The 28th Annual Conference of the Japanese Society for Artificial Intelligence, 2014, "Visualization of vehicle driving state by Deep Sparse Autoencoder" [online] [searched on May 6, 2016], Internet, <URL:https://kaigi.org/jsai/webprogram/2014/pdf/210.pdf>).

More specifically, the acquisition unit 70 of the generation device 151 acquires a plurality of types of status information each indicating a status of the vehicle 1, via a network installed in the vehicle 1.

Specifically, for example, via a CAN (Controller Area Network) 50 installed in the vehicle 1, the acquisition unit 70 acquires, for each predetermined cycle, 10 types of status information respectively indicating the vehicle speed, the steering angle, the brake fluid pressure, the accelerator opening, the engine rotation speed, the yaw rate, the lateral acceleration, the vertical acceleration, the blinker lighting state, and the shift position, as a high dimension information group.

The contents of the pieces of status information are measured by various types of sensors provided in the vehicle 1, for example.

The acquisition unit 70 outputs each piece of the acquired status information, to the learning unit 71.

Figure 3:
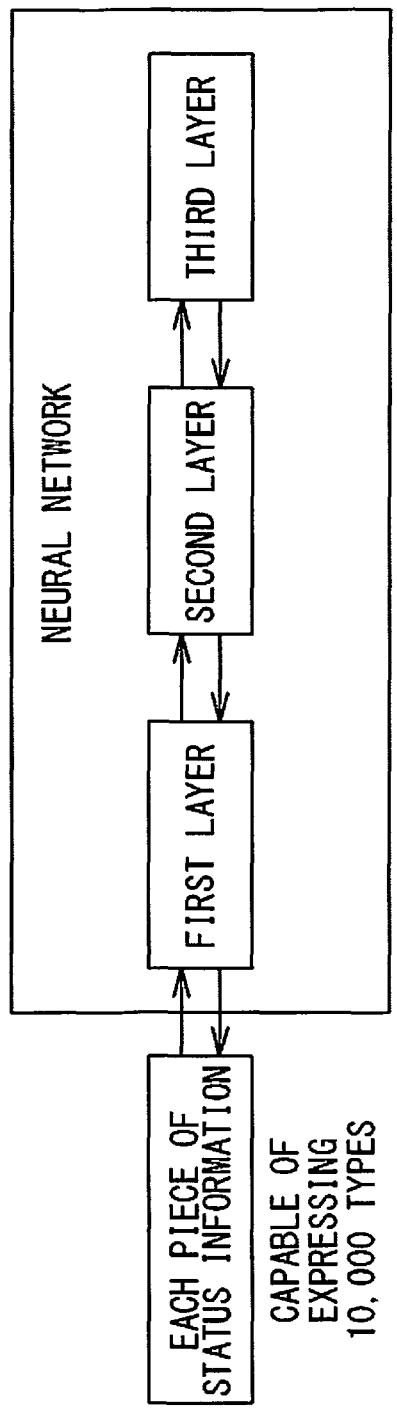
FIG. 3 is a diagram for describing a generation process of a neural network.

FIG. 3 is a diagram for describing a generation process of a neural network.

With reference to FIG. 3, the learning unit 71 accumulates each piece of status information received from the acquisition unit 70, to create a data set of pieces of status information at each acquisition timing. Then, the learning unit 71 generates a neural network on the basis of the created data set.

More specifically, for example, in a case where each piece of status information is expressed by any one of 10000 types of data, the learning unit 71 constructs a neural network that allows the status information to be expressed by any one of 256 types of data.

For example, the learning unit 71 creates, in a trial manner, a three-layer neural network which includes: a first layer which generates an output value having a size that allows expression of 100000 types of data when each piece of status information is used as an input value; a second layer which generates an output value having a size that allows expression of 1000 types of data when the output value of the first layer is used as an input value; and a third layer which generates an output value having a size that allows expression of 256 types of data when the output value of the second layer is used as an input value. The first layer to the third layer each have a network structure, for example.

The second layer can also generate an output value having a size that allows expression of 100000 types of data when the output value of the third layer is used as an input value. The first layer can also generate an output value having a size that allows expression of 10000 types of data when the output value of the second layer is used as an input value.

The relationship between the input value and the output value for each layer can be adjusted by parameters.

The learning unit 71 inputs, as an input value, each piece of status information at a certain acquisition timing included in the data set, into the first layer of the neural network. Then, the learning unit 71 inputs the output value of the first layer to the second layer, and inputs the output value of the second layer to the third layer.

Then, the learning unit 71 inputs the output value of the third layer to the second layer, inputs the output value of the second layer to the first layer, and compares the output value of the first layer and the input value to the first layer with each other.

The learning unit 71 sets a parameter for each layer such that the output value of the first layer and the input value to the first layer match each other.

The learning unit 71 performs a similar process also with respect to each piece of status information at another acquisition timing included in the data set, and adjusts and determines a parameter for each layer.

The learning unit 71 outputs, to the output unit 72, model information indicating the neural network generated in this manner.

When the output unit 72 receives the model information from the learning unit 71, the output unit 72 stores the received model information into an external memory or the like.

Figure 4:
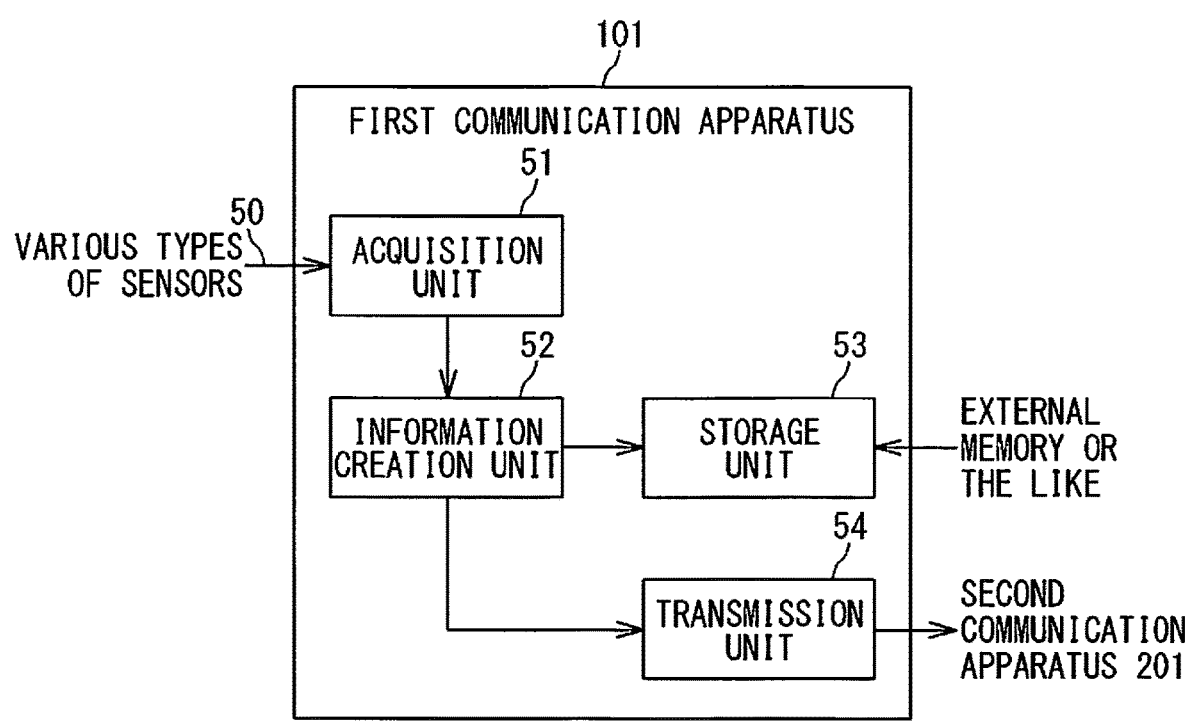
FIG. 4 is a diagram showing a configuration of a first communication apparatus in the communication system according to the first embodiment of the present disclosure.

FIG. 4 is a diagram showing a configuration of the first communication apparatus in the communication system according to the first embodiment of the present disclosure.

With reference to FIG. 4, the first communication apparatus 101 includes an acquisition unit 51, an information creation unit 52, a storage unit 53, and a transmission unit 54.

The operation of the acquisition unit 51 in the first communication apparatus 101 is the same as that of the acquisition unit 70 in the generation device 151 shown in FIG. 2.

The storage unit 53 keeps the model information generated by the generation device 151. The model information is duplicated from the external memory or the like in which the model information is stored, for example. The model information may be directly duplicated by being written from the generation device 151 into the storage unit 53.

The acquisition unit 51 acquires a plurality of types of status information each indicating a status of the vehicle 1A, via the network installed in the vehicle 1A, for example, the CAN 50.

Specifically, for example, via the CAN 50, the acquisition unit 70 acquires, for each predetermined cycle, 10 types of status information respectively indicating the vehicle speed, the steering angle, the brake fluid pressure, the accelerator opening, the engine rotation speed, the yaw rate, the lateral acceleration, the vertical acceleration, the blinker lighting state, and the shift position, as a high dimension information group.

The acquisition unit 51 may acquire each piece of status information through wireless communication. The pieces of status information are not limited to the 10 types of information mentioned above, but may be a smaller number of types of information, or a greater number of types of information. The acquisition unit 51 may acquire each piece of status information at any acquisition timing.

The acquisition unit 51 outputs each piece of the acquired status information to the information creation unit 52.

Figure 5:
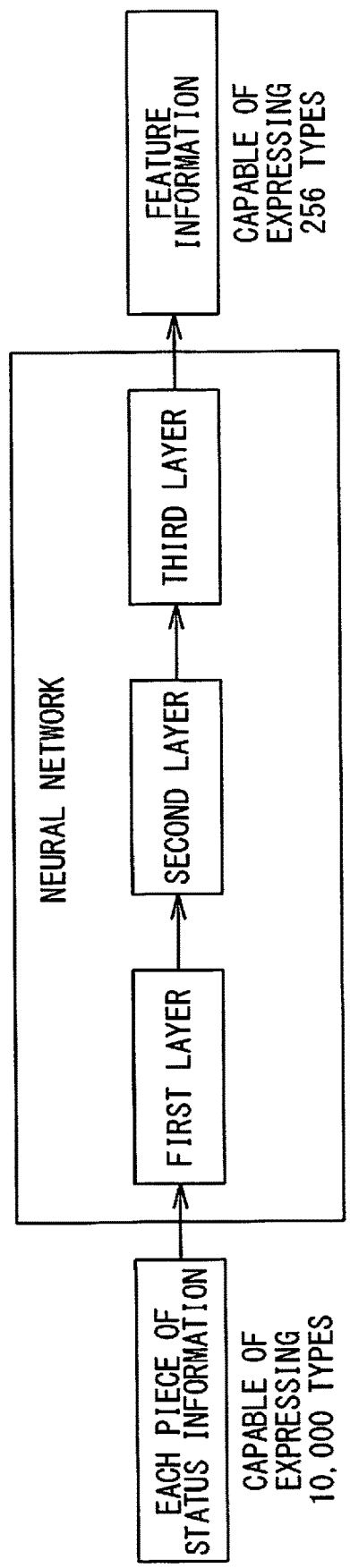
FIG. 5 is a diagram for describing a creation process of feature information performed by an information creation unit of the first communication apparatus according to the first embodiment of the present disclosure.

FIG. 5 is a diagram for describing a creation process of feature information performed by the information creation unit in the first communication apparatus according to the first embodiment of the present disclosure.

With reference to FIG. 5, on the basis of each piece of status information acquired by the acquisition unit 51, the information creation unit 52 creates feature information having a data amount smaller than the total of the data amounts of the respective pieces of status information, the feature information including a feature amount of a traveling status of the vehicle 1A.

Here, for example, the feature information includes the feature amount of a smaller number of types than the number of types of the respective pieces of status information acquired by the acquisition unit 51.

Specifically, for example, the information creation unit 52 creates feature information by use of a calculation method capable of converting 10 types of information into less than 10 types of feature amount.

More specifically, for example, the information creation unit 52 creates feature information by use of Deep Learning described in NON PATENT LITERATURE 1.

Specifically, the information creation unit 52 acquires the model information from the storage unit 53, and generates a neural network shown in, for example, FIG. 5 on the basis of the acquired model information.

Then, the information creation unit 52: inputs, as an input value, each piece of status information received from the acquisition unit 51, into a first layer of the neural network;

inputs the output value of the first layer into a second layer; inputs the output value of the second layer into a third layer; and acquires the output value of the third layer having a size that allows expression of 256 types of data, as a feature amount having a size of 1 byte. The information creation unit 52 creates feature information that includes the acquired feature amount.

Figure 6:
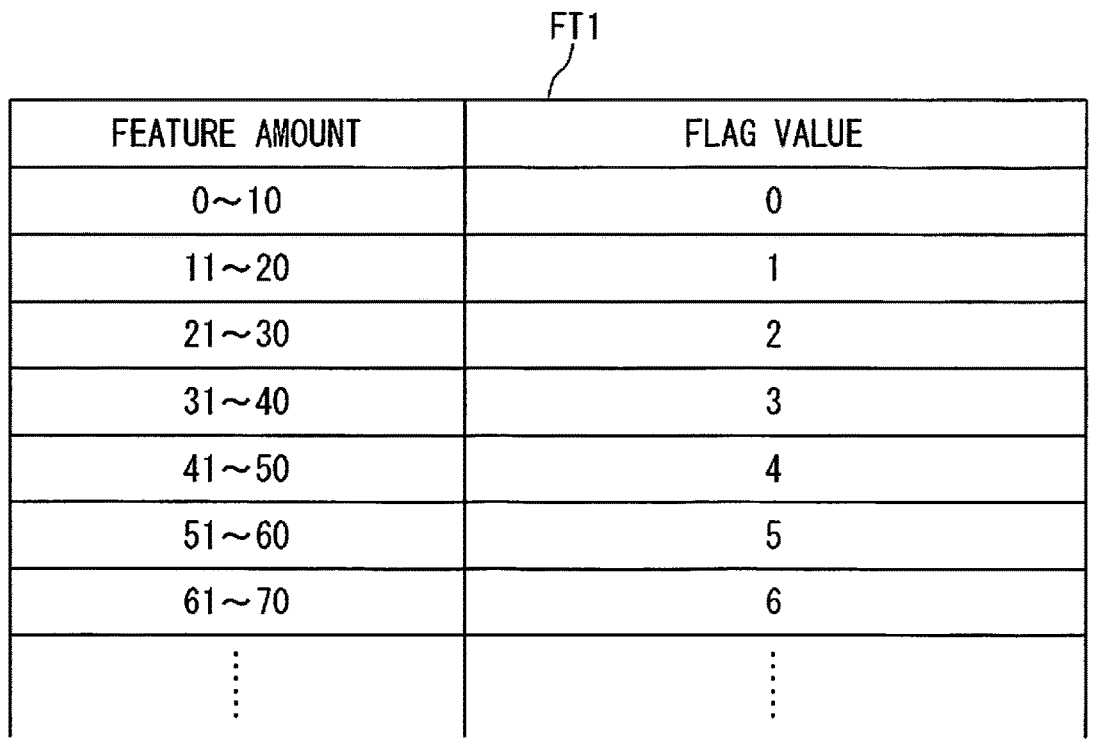
FIG. 6 is a diagram showing one example of a flag value table to be used when the information creation unit of the first communication apparatus creates vehicle information according to the first embodiment of the present disclosure.

FIG. 6 is a diagram showing one example of a flag value table to be used when the information creation unit of the first communication apparatus creates vehicle information according to the first embodiment of the present disclosure. A flag value table FT1 shown in FIG. 6 is stored in the storage unit 53, for example.

With reference to FIG. 6, for example, the information creation unit 52 creates vehicle information that includes a traveling status of the vehicle 1 determined in accordance with a predetermined numeral value range in which the feature amount is included.

More specifically, for example, the information creation unit 52 expresses, in terms of a flag value, feature information by use of the flag value table FT1 which indicates the correspondence relationship between the numeral value range of the feature amount and the flag value indicating the traveling status of the vehicle 1.

More specifically, for example, the behavior of the vehicle 1 and the feature amount included in the feature information correspond to each other. Specifically, when the vehicle 1 is traveling at high speed, is accelerating, is decelerating, is turning right, is turning left, is decelerating before turning left, or is decelerating before turning right, the feature amount included in the feature information indicates a value in the numeral value range of 0-10, 11-20, 21-30, 31-40, 41-50, 51-60, or 61-70, for example.

Flag values 0, 1, 2, 3, 4, 5, and 6 correspond to the numeral value ranges of the feature amount of 0-10, 11-20, 21-30, 31-40, 41-50, 51-60, and 61-70, respectively.

The information creation unit 52 acquires a flag value that corresponds to the feature amount from the flag value table FT1 stored in the storage unit 53, and outputs flag information indicating the acquired flag value, as vehicle information, to the transmission unit 54.

FIG. 7 is a diagram showing one example of a message format to be used in the communication system according to the first embodiment of the present disclosure.

With reference to FIG. 7, the transmission unit 54 transmits the vehicle information based on the feature information created by the information creation unit 52, to the second communication apparatus 201.

For example, the transmission unit 54 creates a message according to the message format shown in FIG. 7 which is described in NON PATENT LITERATURE 2 (ITS Info-communications Forum, "700 MHz BAND INTELLIGENT TRANSPORT SYSTEMS Experimental Guideline for Inter-vehicle Communication Messages ITS FORUM RC-013 ver. 1.0" [online] [searched on Jun. 6, 2016], Internet <URL:www.itsforum.grjp/Public/J7Database/p48/ITS_FORUM_RC-013_v10.pdf>).

More specifically, when the transmission unit 54 has received flag information from the information creation unit 52, the transmission unit 54 stores the received flag information into the free application data field in the message.

In addition, for example, the transmission unit 54 stores various types of information such as the position of the vehicle 1A into the common field in the message. Then, the transmission unit 54 broadcasts the message.

Figure 8:
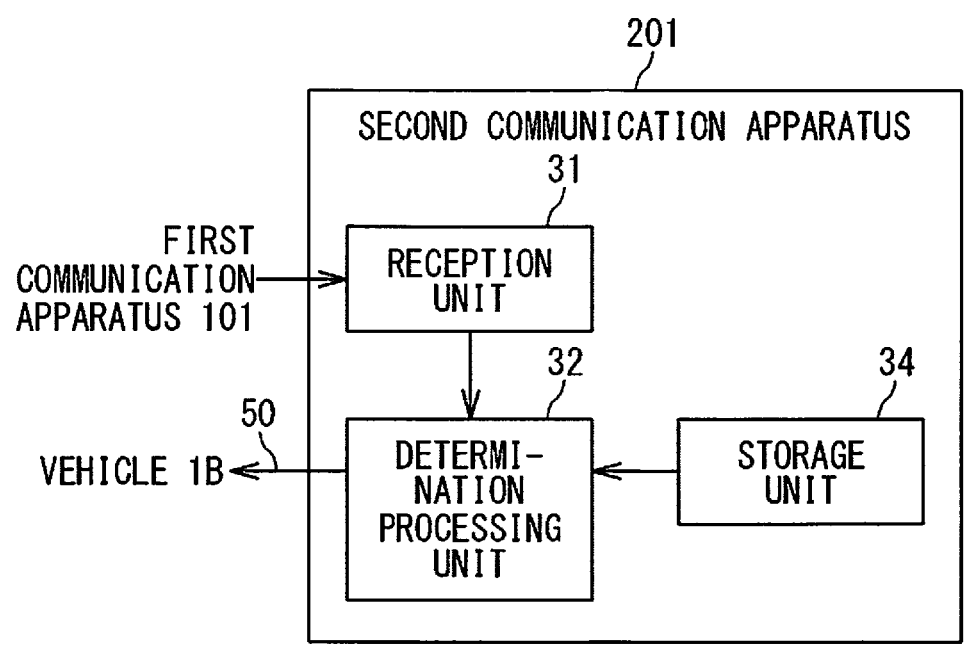
FIG. 8 is a diagram showing a configuration of a second communication apparatus in the communication system according to the first embodiment of the present disclosure.

FIG. 8 is a diagram showing a configuration of the second communication apparatus in the communication system according to the first embodiment of the present disclosure.

With reference to FIG. 8, the second communication apparatus 201 includes a reception unit 31, a determination processing unit (determination unit) 32, and a storage unit 34.

The reception unit 31 of the second communication apparatus 201 receives the vehicle information i.e., the flag information, broadcasted by the first communication apparatus 101.

More specifically, when the reception unit 31 has received the message broadcasted by the first communication apparatus 101, the reception unit 31 outputs the received message to the determination processing unit 32.

Figure 9:
FIG. 9 is a diagram showing one example of a reconstruction table to be used by a determination unit of a second communication apparatus when analyzing a flag value according to the first embodiment of the present disclosure.

FIG. 9 is a diagram showing one example of a reconstruction table to be used by the determination unit of the second communication apparatus when analyzing a flag value according to the first embodiment of the present disclosure. The content of a reconstruction table FT2 shown in FIG. 9 corresponds to the content of the flag value table FT1 shown in FIG. 6, for example. The reconstruction table FT2 is stored in the storage unit 34, for example.

With reference to FIG. 9, the determination processing unit 32 determines the traveling status of the vehicle 1A on the basis of the flag information received by the reception unit 31.

More specifically, when the determination processing unit 32 has received the message from the reception unit 31, the determination processing unit 32 acquires the flag information from the free application data field in the received message, and acquires the behavior of the vehicle 1A that corresponds to the value indicated by the acquired flag information, from the reconstruction table FT2 stored in the storage unit 34.

In addition, the determination processing unit 32 acquires various types of information such as the position of the vehicle 1A, from the common field in the message.

For example, the determination processing unit 32 creates neighborhood vehicle information indicating the behavior of the vehicle 1A, the position of the vehicle 1A, and the like, and transmits the created neighborhood vehicle information to a processing device (not shown) such as ECU (Electronic Control Unit) in the vehicle 1B via the CAN 50.

For example, the processing device determines whether or not to perform an avoidance process of collision with the vehicle 1A on the basis of the neighborhood vehicle information received from the determination processing unit 32 of the second communication apparatus 201.

Specifically, the processing device calculates the relative speed between the vehicle 1B and the vehicle 1A from the time differential of the position of the vehicle 1B and the time differential of the position of the vehicle 1A indicated by the neighborhood vehicle information. The determination processing unit 32 calculates the distance between the vehicle 1B and the vehicle 1A from the position of the vehicle 1B and the position of the vehicle 1A.

Then, for example the processing device determines whether or not collision with the vehicle 1A occurs, on the basis of the behavior of the vehicle 1A indicated by the neighborhood vehicle information, and on the basis of the calculated relative speed and the calculated distance between the vehicles.

For example, when the processing device has recognized that the vehicle 1A is decelerating to the front of the vehicle 1B and that the relative speed is increasing, the processing device determines that collision with the vehicle 1A could occur, and calculates the probability of occurrence of collision with the vehicle 1A on the basis of the distance between the vehicles and the relative speed.

For example, when the calculated probability is not less than a predetermined threshold Td1, the processing device determines that the avoidance process should be performed. Specifically, as the avoidance process, the processing device issues a warning to the driver by means of sound or a display on a display unit, increases the brake fluid pressure in the vehicle 1B so as to decrease the vehicle speed, or manipulates the steering of the vehicle 1B so as to change the traveling lane, for example.

Each of the devices in the communication system includes a computer. An arithmetic processing unit such as CPU in the computer reads from a memory (not shown) a program that includes part or all of the steps in the following sequence diagram or flow chart, and executes the program. Each of the programs for the plurality of devices can be installed from outside. Each of the programs for the plurality of devices is distributed in a state of being stored in a storage medium.

[Operation]

Figure 10:
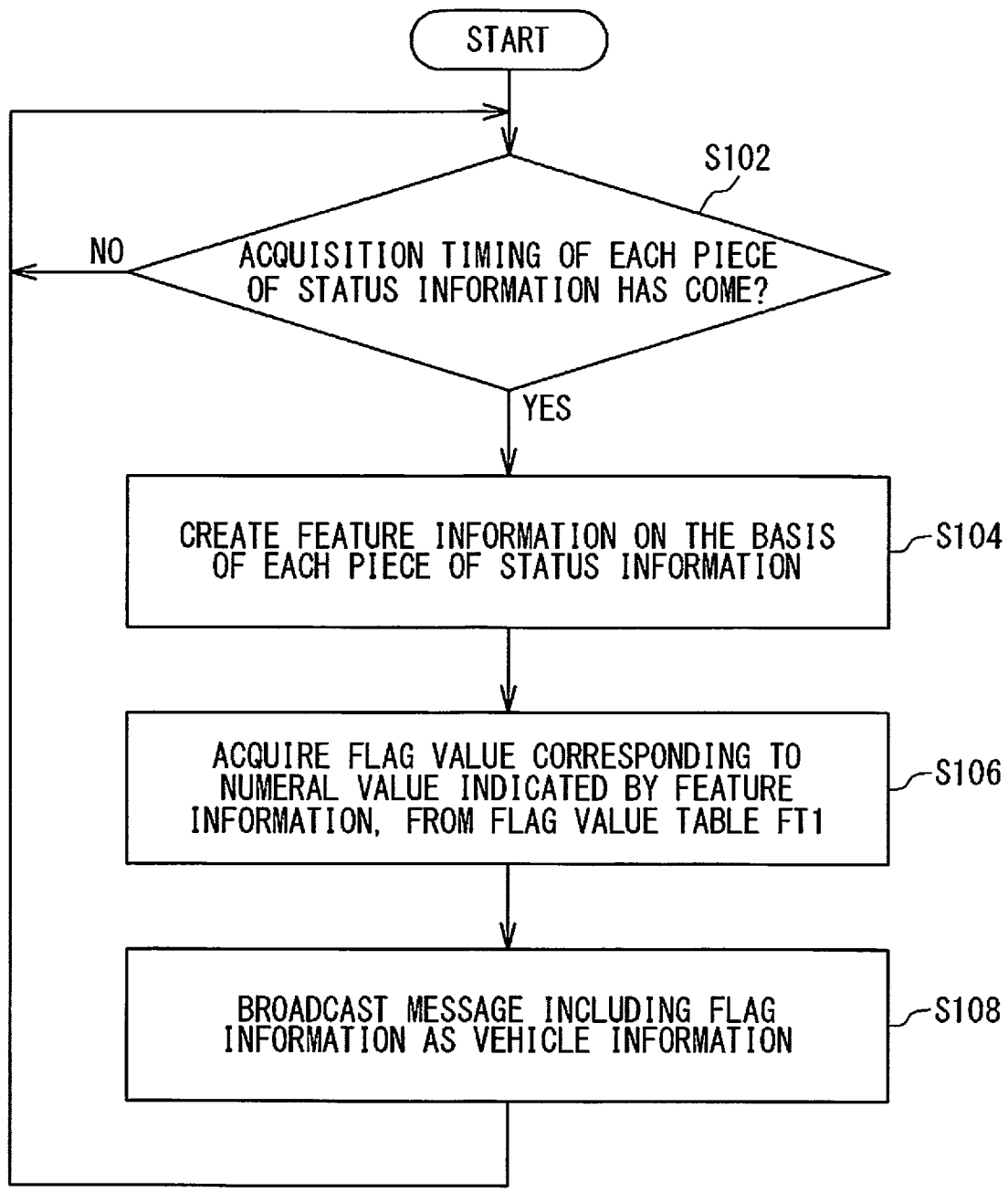
FIG. 10 is a flow chart describing an operation procedure according to which the first communication apparatus creates vehicle information on the basis of each piece of status information according to the first embodiment of the present disclosure.

FIG. 10 is a flow chart describing an operation procedure according to which the first communication apparatus creates vehicle information on the basis of each piece of status information according to the first embodiment of the present disclosure.

With reference to FIG. 10, first, the first communication apparatus 101 waits until an acquisition timing of each piece of status information for each predetermined cycle comes (NO in step S102).

When the acquisition timing has come (YES in step S102), the first communication apparatus 101 acquires each piece of status information via the CAN 50, and creates feature information on the basis of each piece of the acquired status information (step S104).

Next, the first communication apparatus 101 acquires a flag value that corresponds to the feature amount indicated by the created feature information, from the flag value table FT1 (step S106).

Next, the first communication apparatus 101 creates a message that includes, as vehicle information, flag information indicating the flag value in the free application data field and that includes various types of information such as the position of the vehicle 1A in the common field, and broadcasts the created message (step S108).

Next, the first communication apparatus 101 waits until a new acquisition timing comes (NO in step S102).

Figure 11:
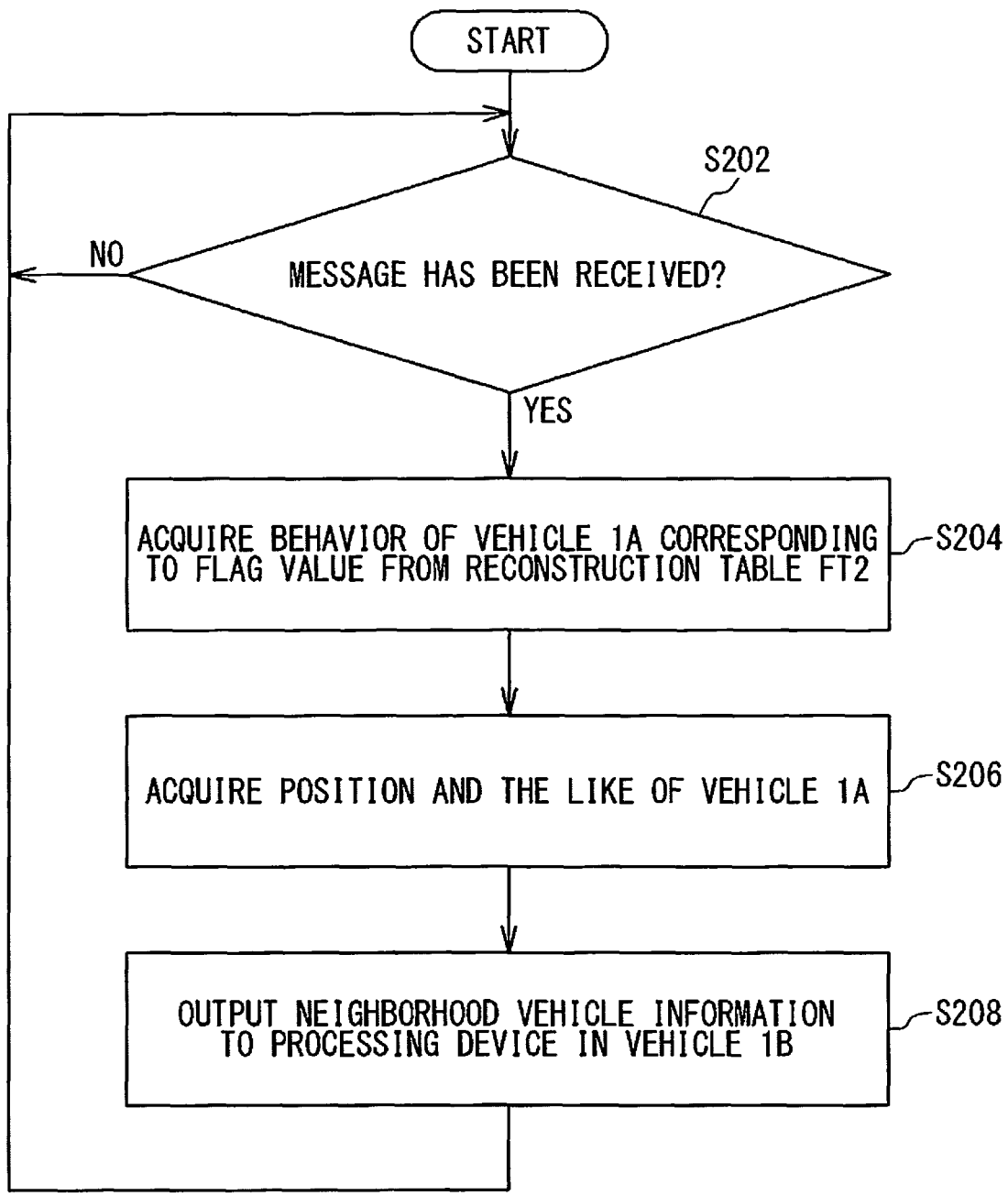
FIG. 11 is a flow chart describing an operation procedure according to which the second communication apparatus determines a traveling status of another vehicle on the basis of vehicle information according to the first embodiment of the present disclosure.

FIG. 11 is a flow chart describing an operation procedure according to which the second communication apparatus determines a traveling status of another vehicle on the basis of vehicle information according to the first embodiment of the present disclosure.

With reference to FIG. 11, first, the second communication apparatus 201 waits until receiving the message broadcasted by the first communication apparatus 101 (NO in step S202).

When the second communication apparatus 201 has received the message broadcasted by the first communication apparatus 101 (YES in step S202), the second communication apparatus 201 acquires the vehicle information, i.e., the flag information from the message, and acquires the behavior of the vehicle 1A that corresponds to the flag value indicated by the acquired flag information, from the reconstruction table FT2 (step S204).

Next, the second communication apparatus 201 acquires the position of the vehicle 1A and the like in the common field in the message (step S206).

Next, the second communication apparatus 201 creates neighborhood vehicle information indicating the behavior of the vehicle 1A, the position of the vehicle 1A, and the like that have been acquired, and transmits the created neighborhood vehicle information to the processing device in the vehicle 1B (step S208).

Next, the second communication apparatus 201 waits until receiving a new message broadcasted by the first communication apparatus 101 (NO in step S202).

The order of steps S204 and S206 is not limited to that described above, and may be reversed.

Figure 12:
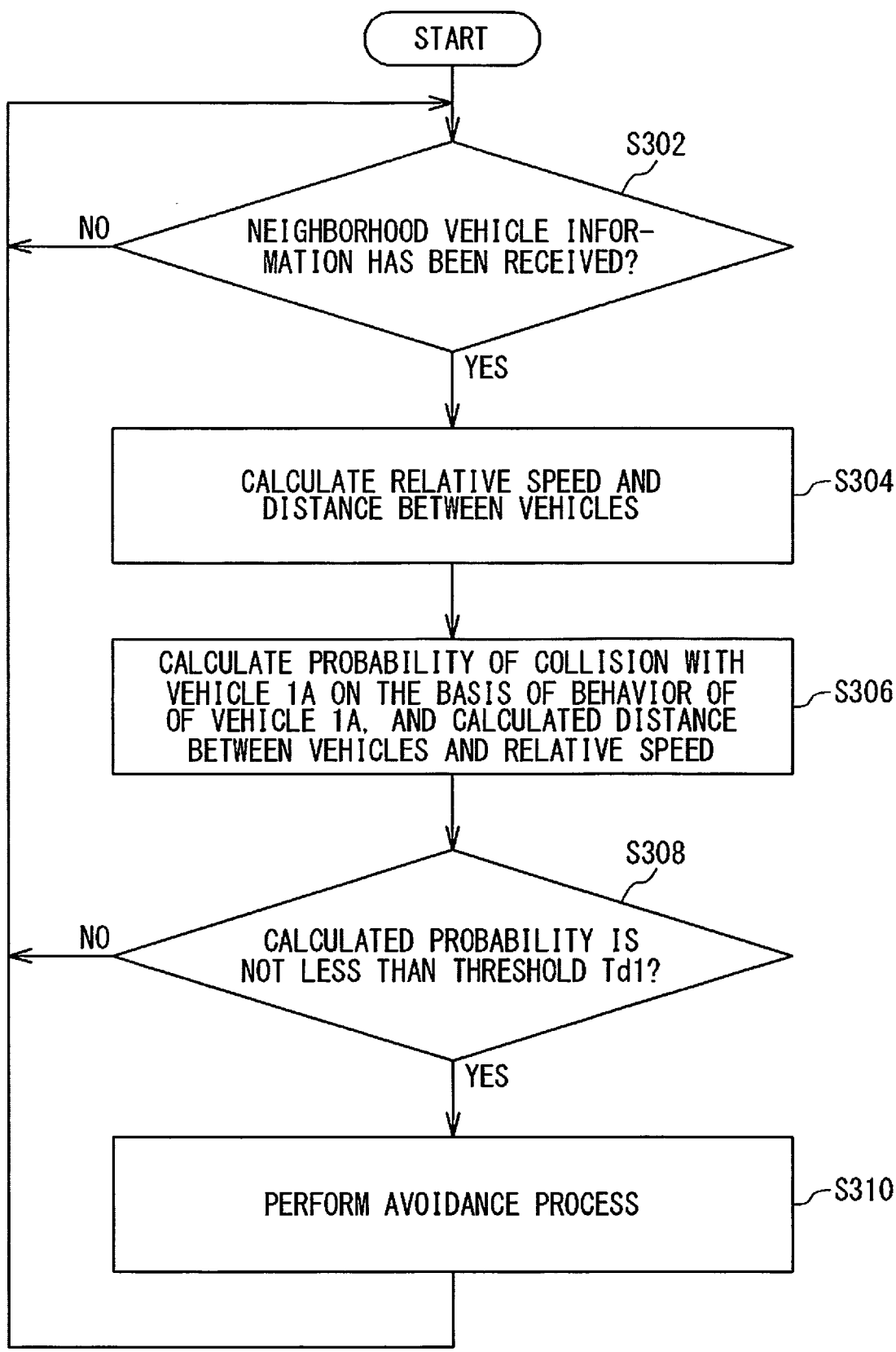
FIG. 12 is a flow chart describing an operation procedure according to which a processing device in the vehicle performs an avoidance process on the basis of a determination result by the second communication apparatus according to the first embodiment of the present disclosure.

FIG. 12 is a flow chart describing an operation procedure according to which the processing device in the vehicle performs an avoidance process on the basis of a determination result by the second communication apparatus according to the first embodiment of the present disclosure.

With reference to FIG. 12, first, the processing device in the vehicle 1B waits until receiving neighborhood vehicle information from the second communication apparatus 201 (NO in step S302).

When the processing device has received neighborhood vehicle information from the second communication apparatus 201 (YES in step S302), the processing device calculates the relative speed between the vehicle 1B and the vehicle 1A and the distance between the vehicle 1B and the vehicle 1A on the basis of the position of the vehicle 1A indicated by the neighborhood vehicle information and the position of the vehicle 1B (step S304).

Next, the processing device calculates the probability of occurrence of collision with the vehicle 1A on the basis of the behavior of the vehicle 1A indicated by the neighborhood vehicle information and the calculated relative speed and the calculated distance between the vehicles (step S306).

Next, when the calculated probability is not less than the predetermined threshold Td1 (YES in step S308), the processing device determines that the avoidance process should be performed, and performs the avoidance process (step S310).

Next, when the processing device has performed the avoidance process (step S310) or when the calculated probability is smaller than the predetermined threshold Td1 (NO in step S308), the processing device waits until receiving new neighborhood vehicle information from the second communication apparatus 201 (NO in step S302).

The communication system according to the first embodiment of the present disclosure is configured such that vehicle information is transmitted from the vehicle 1A to the vehicle 1B. However, the configuration is not limited thereto. A configuration may be employed in which: both of the first communication apparatus 101 and the second communication apparatus 201 are installed in each of the vehicles 1A and 1B; and vehicle information is transmitted from the vehicle 1A to the vehicle 1B and vehicle information is transmitted from the vehicle 1B to the vehicle 1A.

The first communication apparatus according to the first embodiment of the present disclosure is configured such that the transmission unit 54 transmits vehicle information based on feature information to the second communication apparatus 201. However, the configuration is not limited thereto. A configuration may be employed in which the transmission unit 54 transmits vehicle information based on feature information to a wireless terminal device mounted on a vehicle or carried by a pedestrian, specifically, a smartphone, a tablet PC, or the like, in addition to the second communication apparatus 201.

The first communication apparatus according to the first embodiment of the present disclosure is configured such that the information creation unit 52 creates feature information by use of a calculation method capable of converting 10 types of information into less than 10 types of feature amount. However, the configuration is not limited thereto. A configuration may be employed in which the information creation unit 52 creates feature information by use of a calculation method capable of converting L (L is an integer not smaller than 2 and other than 10) types of information into less than L types of feature amount.

The first communication apparatus according to the first embodiment of the present disclosure is configured such that the information creation unit 52 uses Deep Learning as the calculation method capable of converting 10 types of information into less than 10 types of feature amount. However, the configuration is not limited thereto. The information creation unit 52 may be configured to use another method such as principal component analysis, as the calculation method.

Meanwhile, travel information acquired by a vehicle-to-vehicle communication device is information that indicates, for example, the traveling position, the speed, the acceleration, the engine rotation speed, the torque, the brake operation state, the accelerator opening state, and the like of the vehicle. When such vehicle information is transmitted without modification, to another vehicle, the amount of data transmitted in vehicle-to-vehicle communication increases, which could result in difficulty in communication. Meanwhile, when the vehicle-to-vehicle communication device receives travel information from a plurality of vehicles and performs analyzing process of each piece of received travel information, the processing load of the analyzing process in the vehicle-to-vehicle communication device increases.

In contrast to this, the first communication apparatus according to the first embodiment of the present disclosure is installed in the vehicle 1. The acquisition unit 51 acquires a plurality of types of status information each indicating a status of the vehicle 1, via the network installed in the vehicle 1, for example, the CAN 50. On the basis of each piece of status information acquired by the acquisition unit 51, the information creation unit 52 creates feature information having a data amount smaller than the total of data amounts of the respective pieces of status information, the feature information including a feature amount of a traveling status of the vehicle 1. Then, the transmission unit 54 transmits vehicle information based on the feature information created by the information creation unit 52, to another communication apparatus.

Thus, due to the configuration in which vehicle information based on feature information having a data amount smaller than the total of data amounts of the respective pieces of status information is transmitted, the amount of data transmitted in vehicle-to-vehicle communication, for example, can be decreased when compared with a configuration in which pieces of status information are transmitted without modification, to another communication apparatus. Therefore, the status of the vehicle can be efficiently transmitted to another vehicle. Accordingly, occurrence of difficulty in communication can be prevented. In addition, the other communication apparatus can acquire the traveling status of the vehicle 1 on the basis of the vehicle information without performing analysis of each piece of status information. Accordingly, for example, also when another communication apparatus receives vehicle information from a plurality of first communication apparatuses 101, the processing load in the other communication apparatus can be reduced.

In the first communication apparatus according to the first embodiment of the present disclosure, the feature information includes the feature amount of a smaller number of types than the number of types of the respective pieces of status information acquired by the acquisition unit 51.

With this configuration, for example, feature information can be created on the basis of status information of types that are relevant to the traveling status of the vehicle 1 among pieces of status information acquired by the acquisition unit 51. Therefore, the data amount of the feature information can be effectively reduced.

In the first communication apparatus according to the first embodiment of the present disclosure, the information creation unit 52 creates feature information by use of a calculation method capable of converting K types of information into less than K types of feature amount. Here, K is an integer not smaller than 2.

Due to the configuration using a calculation method capable of converting huge information into small information, such as Deep Learning or principal component analysis, for example, feature information having a smaller data amount can be efficiently created.

In the first communication apparatus according to the first embodiment of the present disclosure, the information creation unit 52 creates vehicle information that includes a traveling status of the vehicle 1 determined in accordance with a predetermined numeral value range which includes the feature amount.

With this configuration, for example, even when the correspondence relationship between the feature amount and the traveling status of the vehicle 1 varies for each type of the vehicle 1, a correct traveling status of the vehicle 1 can be transmitted to another communication apparatus. In addition, for example, since the size of vehicle information can be made smaller than that of feature information because the traveling status of the vehicle 1 is expressed in terms of a flag value, the amount of data transmitted in vehicle-to-vehicle communication or the like can be further decreased. In another communication apparatus, for example, also when the correspondence relationship between the numeral value range of the feature amount and the traveling status of the vehicle 1 varies for each type of the vehicle 1, the traveling status of the vehicle 1 can be easily and correctly acquired from the vehicle information.

In the communication system according to the first embodiment of the present disclosure, the first communication apparatus 101 is installed in the vehicle 1, and transmits vehicle information based on feature information created on the basis of a plurality of types of status information each indicating a status of the vehicle 1, the feature information having a data amount smaller than the total of data amounts of the respective pieces of state information and including a feature amount of a traveling status of the vehicle 1. The second communication apparatus 201 receives the vehicle information transmitted by the first communication apparatus 101.

Thus, in the communication system 301, due to the configuration in which vehicle information based on feature information having a data amount smaller than the total of data amounts of the respective pieces of status information is transmitted, the amount of data transmitted in vehicle-to-vehicle communication, for example, can be decreased when compared with a configuration in which pieces of status information are transmitted without modification. Therefore, the status of the vehicle can be efficiently transmitted from the first communication apparatus 101 to the second communication apparatus 201. Accordingly, occurrence of difficulty in communication can be prevented. In addition, the second communication apparatus 201 can acquire the traveling status of the vehicle 1 on the basis of the vehicle information without performing analysis of each piece of status information. Accordingly, for example, also when the second communication apparatus 201 receives vehicle information from a plurality of first communication apparatuses 101, the processing load in the second communication apparatus 201 can be reduced.

Next, another embodiment of the present disclosure is described with reference to the drawings. In the drawings, the same or corresponding parts are denoted by the same reference signs, and will not be repeatedly described.

Second Embodiment

The present embodiment relates to a communication system in which feature information is transmitted without being expressed in terms of flag value, compared with the communication system according to the first embodiment. The contents other than those described below are the same as those of the communication system according to the first embodiment.

Figure 13:
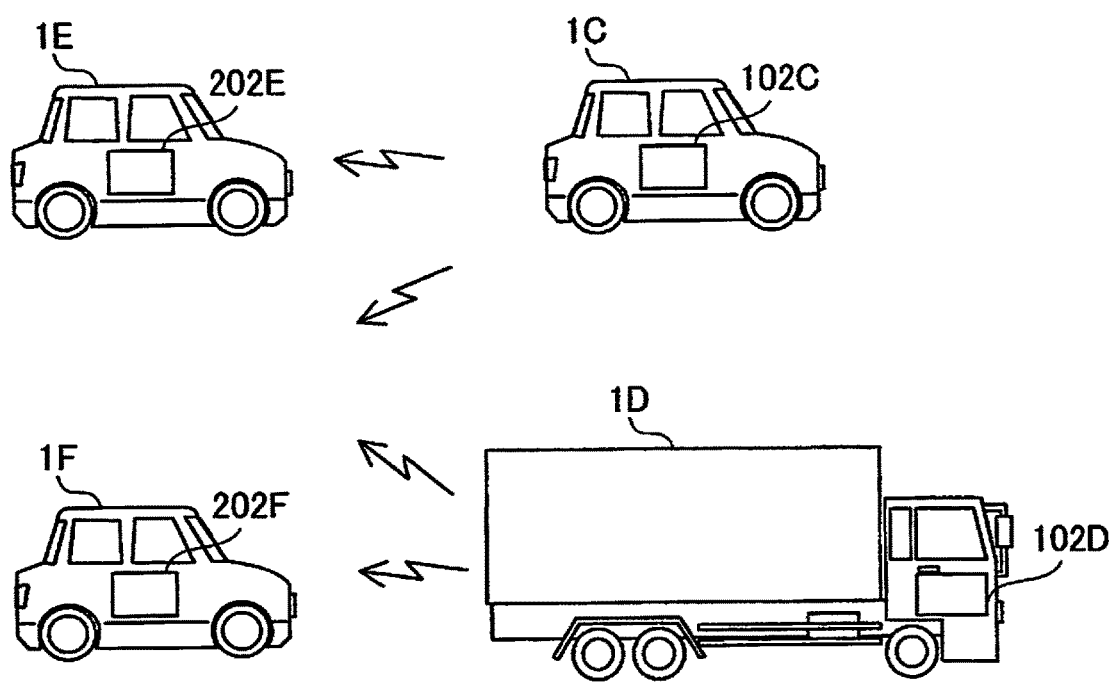
FIG. 13 is a diagram showing a configuration of a communication system according to a second embodiment of the present disclosure.

FIG. 13 is a diagram showing a configuration of a communication system according to a second embodiment of the present disclosure.

With reference to FIG. 13, a communication system 302 includes first communication apparatuses 102C, 102D and second communication apparatuses 202E, 202F. Hereinafter, each of the first communication apparatuses 102C, 102D is also referred to as first communication apparatus 102. Each of the second communication apparatuses 202E, 202F is also referred to as second communication apparatus 202.

The communication system 302 may be configured to include one, or three or more first communication apparatuses 102. The communication system 302 may be configured to include one, or three or more second communication apparatuses 202.

The first communication apparatus 102 is, for example, an on-vehicle device such as a navigation device, or a wireless terminal device portable by a person, such as a tablet terminal or a smartphone.

The second communication apparatus 202 is, for example, an on-vehicle device such as a navigation device, or a wireless terminal device portable by a person, such as a tablet terminal or a smartphone.

The first communication apparatuses 102C, 102D are installed in the vehicles 1C, 1D, respectively. The vehicles 1C, 1D are, for example, a passenger car and a truck, and are of different types from each other.

The second communication apparatuses 202E, 202F are respectively installed in the vehicles 1E, 1F, which are each the vehicle 1, for example. Each of the vehicles 1E, 1F is a passenger car, for example. The second communication apparatus 202 may not be installed in the vehicle 1.

The first communication apparatus 102 can perform vehicle-to-vehicle communication with the second communication apparatus 202 by broadcasting a radio wave that contains various types of information.

Figure 14:
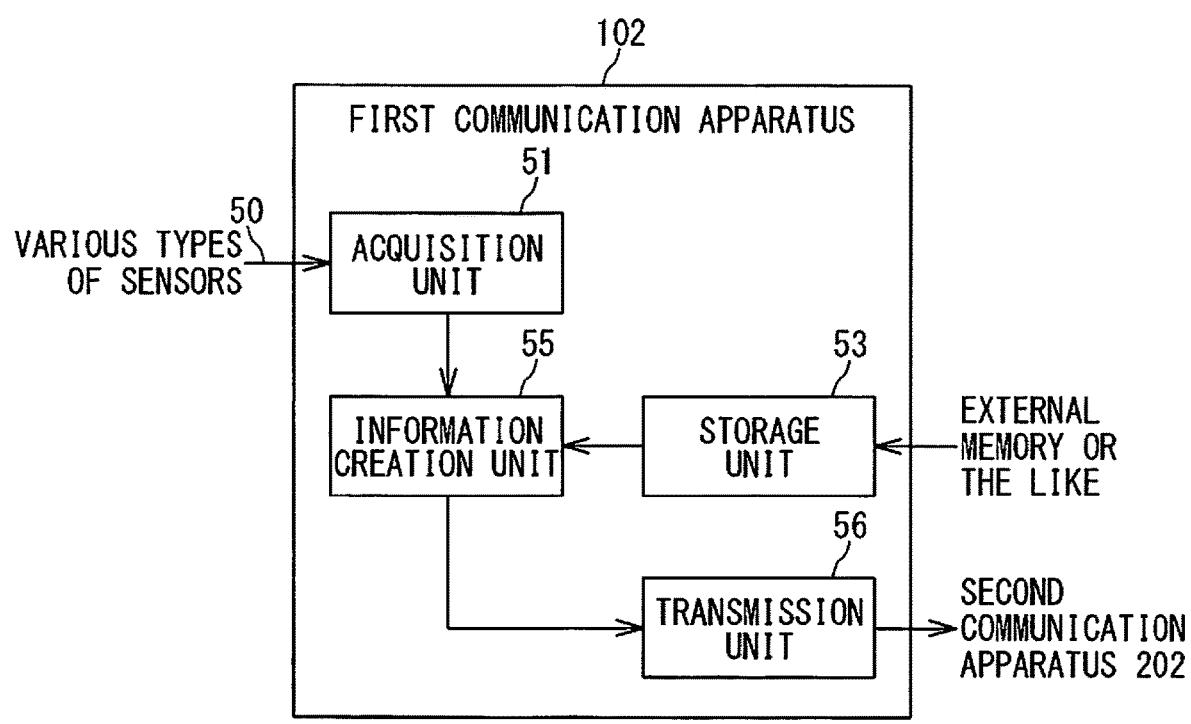
FIG. 14 is a diagram showing a configuration of a first communication apparatus in a communication system according to the second embodiment of the present disclosure.

FIG. 14 is a diagram showing a configuration of the first communication apparatus in the communication system according to the second embodiment of the present disclosure.

With reference to FIG. 14, the first communication apparatus 102 includes the acquisition unit 51, the storage unit 53, an information creation unit 55, and a transmission unit 56.

Operations of the acquisition unit 51 and the storage unit 53 in the first communication apparatus 102 are respectively the same as those of the acquisition unit 51 and the storage unit 53 of the first communication apparatus 101 shown in FIG. 4.

Figure 15:
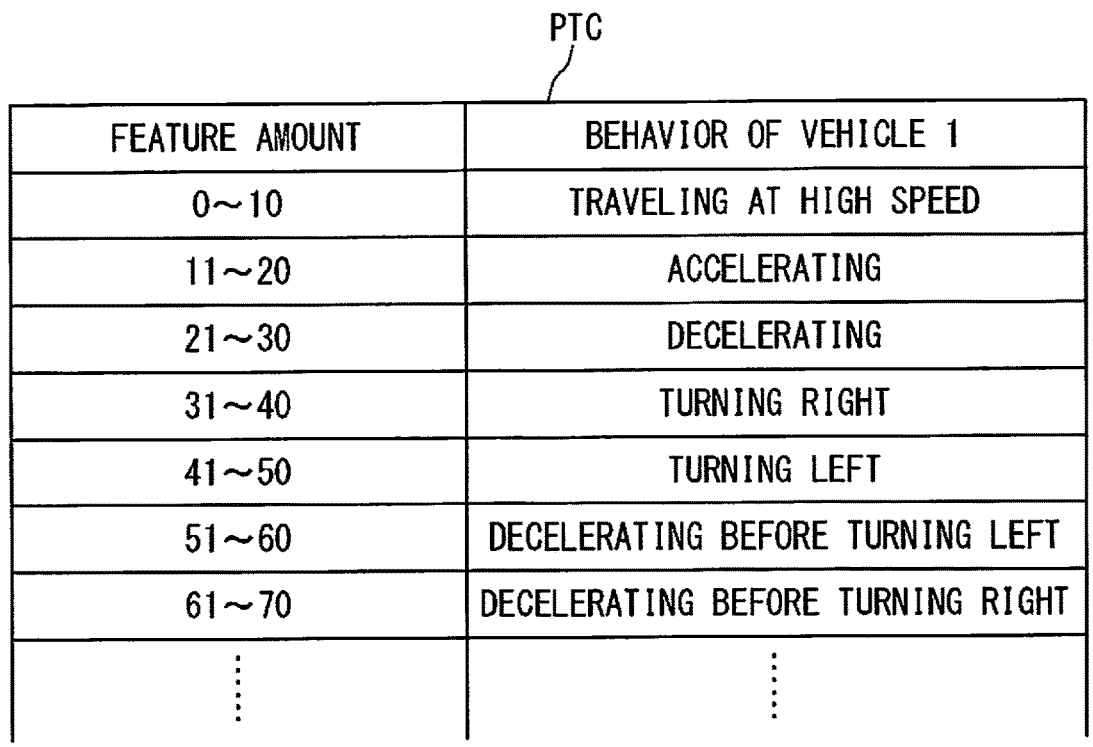
FIG. 15 is a diagram showing one example of correspondence information transmitted by a transmission unit of the first communication apparatus according to the second embodiment of the present disclosure.

FIG. 15 is a diagram showing one example of correspondence information transmitted by the transmission unit of the first communication apparatus according to the second embodiment of the present disclosure.

With reference to FIG. 15, a correspondence table PTC is one example of correspondence information indicating the correspondence relationship between the numeral value range of the feature amount and the traveling status of the vehicle 1. Here, the correspondence table PTC is different for each type of the vehicle 1, for example.

More specifically, for example, the correspondence table PTC is used for the vehicle 1C which is a passenger car, and indicates the correspondence relationship between the feature amount included in the feature information and the behavior of the vehicle 1C. The correspondence table PTC is stored in the storage unit 53 of the first communication apparatus 102C, for example.

Figure 16:
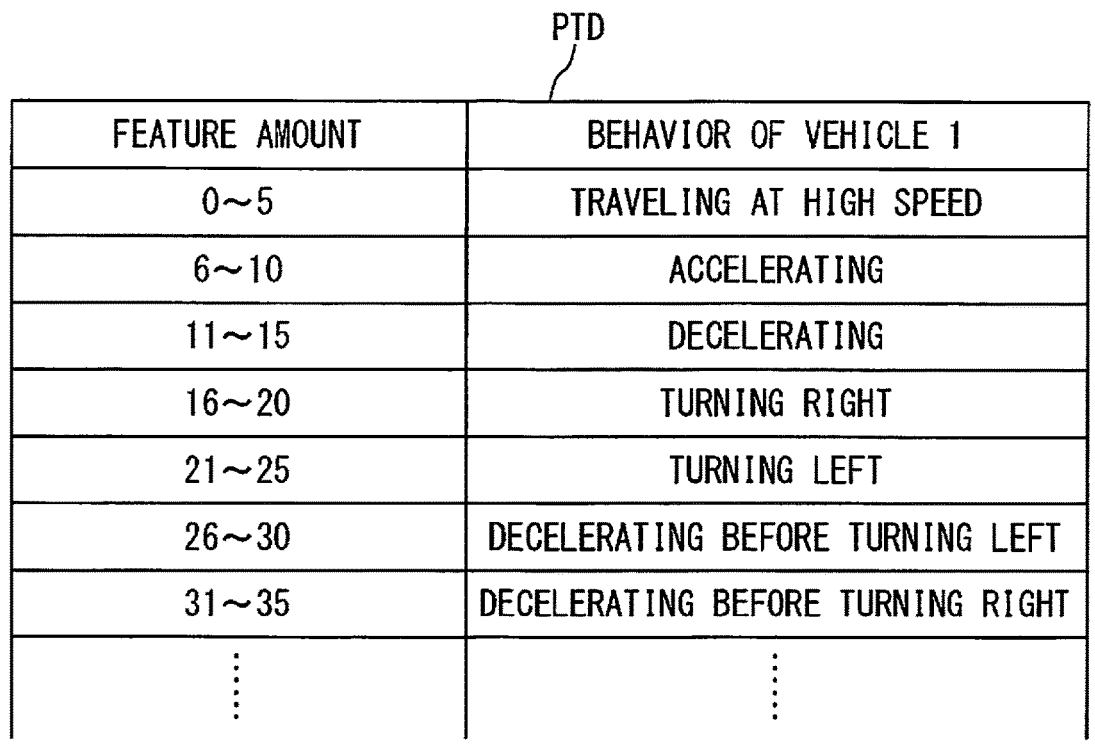
FIG. 16 is a diagram showing another example of the correspondence information transmitted by the transmission unit of the first communication apparatus according to the second embodiment of the present disclosure.

FIG. 16 is a diagram showing another example of correspondence information transmitted by the transmission unit of the first communication apparatus according to the second embodiment of the present disclosure.

With reference to FIG. 16, a correspondence table PTD is one example of correspondence information and is used for the vehicle 1D which is a truck, for example. The correspondence table PTD is stored in the storage unit 53 of the first communication apparatus 102D, for example.

In the following, the process performed in the first communication apparatus 102C is described, but the process in the first communication apparatus 102D is also performed in the same manner.

The information creation unit 55 of the first communication apparatus 102C acquires model information from the storage unit 53, and generates a neural network shown in FIG. 5, for example, on the basis of the acquired model information.

Then, the information creation unit 55 inputs, as an input value, each piece of status information received from the acquisition unit 51, into a first layer of the neural network; inputs the output value of the first layer into a second layer; inputs the output value of the second layer into a third layer; and acquires the output value of the third layer expressed by 256 types of data, as a feature amount having a size of 1 byte.

The information creation unit 55 creates feature information that includes the acquired feature amount, and outputs the created feature information to the transmission unit 56, as vehicle information.

For example, the transmission unit 56 transmits, to the second communication apparatus 202, the feature information as vehicle information, and correspondence information indicating the correspondence relationship between the numeral value range of the feature amount and the traveling status of the vehicle 1.

More specifically, when the transmission unit 56 has received the feature information, i.e., the vehicle information, from the information creation unit 55, the transmission unit 56 acquires the correspondence table PTC from the storage unit 53, and stores the vehicle information and the correspondence information indicating the correspondence table PTC, into the free application data field in the message (see FIG. 7).

In addition, for example, the transmission unit 56 stores various types of information such as the position of the vehicle 1C into the common field in the message. Then, the transmission unit 56 broadcasts the message.

Figure 17:
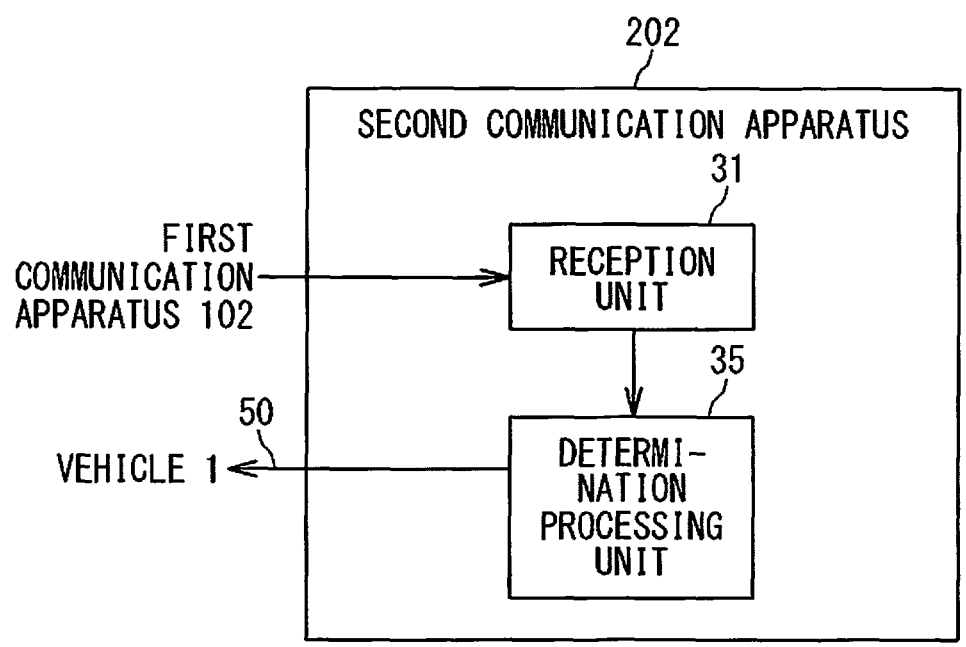
FIG. 17 is a diagram showing a configuration of a second communication apparatus in the communication system according to the second embodiment of the present disclosure.

FIG. 17 is a diagram showing a configuration of the second communication apparatus in the communication system according to the second embodiment of the present disclosure.

With reference to FIG. 17, the second communication apparatus 202 includes the reception unit 31 and a determination processing unit (determination unit) 35.

In the following, the process performed in the second communication apparatus 202E is described, but the process in the second communication apparatus 202F is also performed in the same manner.

The reception unit 31 of the second communication apparatus 202E receives the vehicle information, i.e., the feature information, and the correspondence information. More specifically, for example, when the reception unit 31 has received the message broadcasted by the first communication apparatus 102C, the reception unit 31 outputs the received message to the determination processing unit 35.

On the basis of the feature information and the correspondence information received by the reception unit 31, the determination processing unit 35 determines the traveling status of the vehicle 1.

Specifically, when the determination processing unit 35 has received the message from the reception unit 31, the determination processing unit 35 acquires the feature information and the correspondence information in the free application data field in the received message.

Then, the determination processing unit 35 acquires the behavior of the vehicle 1C that corresponds to the feature amount included in the feature information from the correspondence table PTC (see FIG. 15) indicated by the correspondence information.

In addition, the determination processing unit 35 acquires various types of information such as the position of the vehicle 1C from the common field in the message.

For example, the determination processing unit 35 creates neighborhood vehicle information indicating the behavior of the vehicle 1C, the position of the vehicle 1C, and the like, and transmits the created neighborhood vehicle information to a processing device (not shown) in the vehicle 1E via the CAN 50.

The determination processing unit 35 also processes the message broadcasted by the first communication apparatus 102D, in a similar manner to the message broadcasted by the first communication apparatus 102C.

[Operation]

Figure 18:
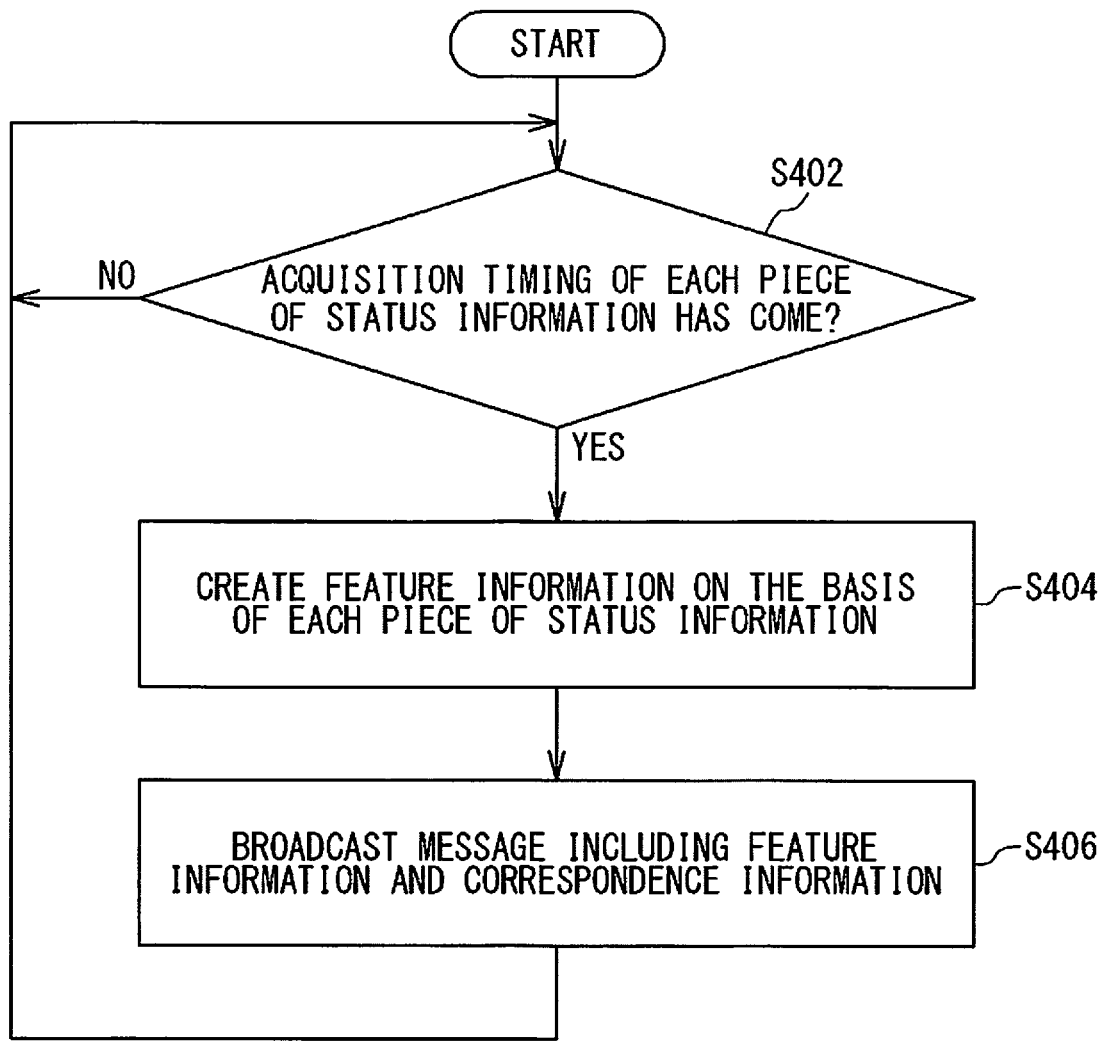
FIG. 18 is a flow chart describing an operation procedure according to which the first communication apparatus creates vehicle information on the basis of each piece of status information according to the second embodiment of the present disclosure.

FIG. 18 is a flow chart describing an operation procedure according to which the first communication apparatus creates vehicle information on the basis of each piece of status information according to the second embodiment of the present disclosure. In the following, the operation of the first communication apparatus 102C is described, but the operation by the first communication apparatus 102D is also performed in the same manner.

With reference to FIG. 18, first, the first communication apparatus 102C waits until an acquisition timing of each piece of status information for each predetermined cycle comes (NO in step S402).

When the acquisition timing has come (YES in step S402), the first communication apparatus 102C acquires each piece of status information via the CAN 50, and creates feature information on the basis of each piece of the acquired status information (step S404).

Next, the first communication apparatus 102C creates a message and broadcasts the created message. This message includes the feature information created by the first communication apparatus 102C as vehicle information in the free application data field, includes correspondence information indicating the correspondence table PTC in the free application data field, and includes various types of information such as the position of the vehicle 1C in the common field (step S406).

Next, the first communication apparatus 102C waits until a new acquisition timing comes (NO in step S402).

FIG. 19 is a flow chart describing an operation procedure according to which the second communication apparatus determines the traveling status of another vehicle on the basis of vehicle information and correspondence information according to the second embodiment of the present disclosure. In the following, the operation performed by the second communication apparatus 202E is described, but the operation by the second communication apparatus 202F is also performed in the same manner.

With reference to FIG. 19, first, the second communication apparatus 202E waits until receiving the message broadcasted by the first communication apparatus 102 (NO in step S502).

Then, for example, when the second communication apparatus 202E has received the message broadcasted by the first communication apparatus 102C (YES in step S502), the second communication apparatus 202E acquires the vehicle information, i.e., the feature information, and the correspondence information from the message, and acquires the behavior of the vehicle 1C that corresponds to the feature amount included in the acquired feature information, from the correspondence table PTC indicated by the correspondence information (step S504).

Next, the second communication apparatus 202E acquires various types of information such as the position of the vehicle 1C from the common field in the message (step S506).

Next, the second communication apparatus 202E creates neighborhood vehicle information indicating the behavior of the vehicle 1C, the position of the vehicle 1C, and the like that have been acquired, and transmits the created neighborhood vehicle information to the processing device in the vehicle 1E (step S508).

Next, the second communication apparatus 202E waits until receiving a new message broadcasted by the first communication apparatus 102 (NO in step S502).

The order of steps S504 and S506 is not limited to that described above, and may be reversed.

The communication system according to the second embodiment of the present disclosure is configured such that feature information and correspondence information are transmitted from the vehicles 1C, 1D to the vehicles 1E, 1F. However, the configuration is not limited thereto. A configuration may be employed in which: both of the first communication apparatus 102 and the second communication apparatus 202 are installed in each of the vehicles 1C to 1F; and feature information and correspondence information are transmitted from the vehicle 1C to the vehicles 1D, 1E, 1F; feature information and correspondence information are transmitted from the vehicle 1D to the vehicles 1C, 1E, 1F; feature information and correspondence information are transmitted from the vehicle 1E to the vehicles 1C, 1D, 1F;

and feature information and correspondence information are transmitted from the vehicle 1F to the vehicles 1C, 1D, 1E.

The first communication apparatus according to the second embodiment of the present disclosure is configured such that the transmission unit 56 transmits feature information and correspondence information included in the same message. However, the configuration is not limited thereto. The transmission unit 56 may be configured to transmit feature information and correspondence information, separately.

The first communication apparatus according to the second embodiment of the present disclosure is configured such that the transmission unit 56 transmits feature information and correspondence information to the second communication apparatus 202. However, the configuration is not limited thereto. A configuration may be employed in which the transmission unit 56 transmits feature information and correspondence information to a wireless terminal device mounted on a vehicle or carried by a pedestrian, specifically, a smartphone, a tablet PC, or the like, in addition to the second communication apparatus 202.

As described above, in the first communication apparatus according to the second embodiment of the present disclosure, the transmission unit 56 transmits feature information as vehicle information, and transmits correspondence information indicating the correspondence relationship between the numeral value range of the feature amount and the traveling status of the vehicle 1, to another communication apparatus.

Therefore, due to the configuration in which the feature amount included in the feature information is transmitted without modification, the degree of freedom of processing the feature amount in another communication apparatus can be enhanced. In addition, in another communication apparatus, the traveling status of the vehicle 1 can be acquired from the feature information by use of the correspondence information.

In the first communication apparatus according to the second embodiment of the present disclosure, the correspondence information is different for each type of the vehicle 1.

With this configuration, for example, even in a case where the performance is different for each type of the vehicle 1, and the correspondence relationship between the numeral value range of the feature amount and the traveling status of the vehicle 1 varies for each type of the vehicle 1, the traveling status of the vehicle 1 can be correctly acquired from the feature information in another communication apparatus.

The second communication apparatus according to the second embodiment of the present disclosure is installed in the vehicle 1. The reception unit 31 receives: feature information having a data amount smaller than the total of data amounts of a plurality of types of status information each indicating a status of the vehicle 1, the feature information including a feature amount of a traveling status of the vehicle 1; and correspondence information indicating the correspondence relationship between the numeral value range of the feature amount and the traveling status of the vehicle 1. The determination processing unit 35 determines the traveling status of the vehicle 1 on the basis of the feature information and the correspondence information received by the reception unit 31.

Thus, due to the configuration in which feature information having a data amount smaller than the total of data amounts of the respective pieces of status information is received, the amount of data transmitted in vehicle-to-vehicle communication, for example, can be decreased when compared with a configuration in which pieces of status information are received without modification. Therefore, the status of the vehicle can be efficiently transmitted to another vehicle. Accordingly, occurrence of difficulty in communication can be prevented. In addition, the second communication apparatus 202 can acquire the traveling status of the vehicle 1 on the basis of the feature information and the correspondence information without performing analysis of each piece of status information. Accordingly, for example, also when the second communication apparatus 202 receives feature information and correspondence information from a plurality of the first communication apparatuses 102, the processing load in the second communication apparatus 202 can be reduced. In the second communication apparatus 202, for example, even in a case where the correspondence relationship between the numeral value range of the feature amount and the traveling status of the vehicle 1 varies for each type of the vehicle 1, the traveling status of the vehicle 1 can be easily and correctly acquired.

It should be noted that part or all of components and operations of devices according to the first embodiment and the second embodiment of the present disclosure can be combined as appropriate.

Specifically, for example, the mode of the first communication apparatus can switched among: a mode in which vehicle information, e.g. flag information, based on feature information is transmitted; a mode in which feature information is transmitted as vehicle information and correspondence information is transmitted; and a mode in which flag information, feature information, and correspondence information are transmitted. In accordance with the mode, the first communication apparatus may transmit flag information, may transmit feature information and correspondence information, or may transmit flag information, feature information, and correspondence information.

It should be noted that the embodiments above are to be considered in all respects as illustrative and not restrictive. The scope of the present disclosure is indicated by the appended claims rather than by the above description, and all changes which come within the meaning and range of equivalency of the claims are therefore intended to be embraced therein.

The above description includes the features in the additional notes below.

[Additional Note 1]

A communication apparatus installed in a vehicle, the communication apparatus including:

an acquisition unit configured to acquire, via a network installed in the vehicle, a plurality of types of status information each indicating a status of the vehicle;

an information creation unit configured to create, on the basis of each piece of the status information acquired by the acquisition unit, feature information having a data amount smaller than a total of data amounts of the respective pieces of the status information, the feature information including a feature amount of a traveling status of the vehicle; and a transmission unit configured to transmit vehicle information based on the feature information created by the information creation unit, to another communication apparatus, wherein the communication apparatus is a navigation device, a tablet terminal, or a smartphone, the acquisition unit acquires, via a CAN (Controller Area Network) installed in the vehicle, 10 types of the status information respectively indicating a vehicle speed, a steering angle, a brake fluid pressure, an accelerator opening, an engine rotation speed, a yaw rate, a lateral acceleration, a vertical acceleration, a blinker lighting state, and a shift position, the information creation unit creates, by use of Deep Learning, the feature information having a size of 1 byte on the basis of the 10 types of the status information acquired by the acquisition unit, by use of a flag value table indicating a correspondence relationship between the feature amount and a flag value, the information creation unit acquires a flag value that corresponds to the feature amount included in the created feature information, from the flag value table, and the transmission unit broadcasts, to the other communication apparatus, flag information indicating the flag value acquired by the information creation unit, as the vehicle information.

[Additional Note 2]

A communication apparatus installed in a vehicle, the communication apparatus comprising:

a reception unit configured to receive feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and a determination unit configured to determine a traveling status of the vehicle on the basis of the feature information and the correspondence information received by the reception unit, wherein the communication apparatus is a navigation device, a tablet terminal, or a smartphone, the reception unit receives the feature information having a size of 1 byte and having a data amount smaller than a total of data amounts of 10 types of the status information respectively indicating a vehicle speed, a steering angle, a brake fluid pressure, an accelerator opening, an engine rotation speed, a yaw rate, a lateral acceleration, a vertical acceleration, a blinker lighting state, and a shift position, and correspondence information indicating a correspondence table that indicates a correspondence relationship between a numeral value range of the feature amount and a behavior of the vehicle, and the determination unit acquires a behavior of the vehicle that corresponds to the feature amount included in the feature information from the correspondence table indicated by the correspondence information.

[Additional Note 3]

A communication system comprising:

a first communication apparatus installed in a vehicle, the first communication apparatus configured to transmit vehicle information based on feature information created on the basis of a plurality of types of status information each indicating a status of the vehicle, the feature information having a data amount smaller than a total of data amounts of the respective pieces of the status information, the feature information including a feature amount of a traveling status of the vehicle; and a second communication apparatus configured to receive the vehicle information transmitted by the first communication apparatus, wherein the first communication apparatus is a navigation device, a tablet terminal, or a smartphone, the first communication apparatus acquires, via a CAN installed in the vehicle, 10 types of the status information respectively indicating a vehicle speed, a steering angle, a brake fluid pressure, an accelerator opening, an engine rotation speed, a yaw rate, a lateral acceleration, a vertical acceleration, a blinker lighting state, and a shift position, creates, by use of Deep Learning, the feature information having a size of 1 byte on the basis of the acquired 10 types of the status information, acquires, by use of a flag value table indicating a correspondence relationship between the feature amount and a flag value, a flag value that corresponds to the feature amount included in the created feature information, from the flag value table, and broadcasts flag information indicating the acquired flag value as the vehicle information, and the second communication apparatus is a navigation device, a tablet terminal, or a smartphone.

REFERENCE SIGNS LIST 1, 1A, 1B, 1C, 1D, 1E, 1F vehicle
31 reception unit
32 determination processing unit (determination unit)
34 storage unit
35 determination processing unit (determination unit)
50 CAN
51 acquisition unit
52 information creation unit
53 storage unit
54 transmission unit
55 information creation unit
56 transmission unit
70 acquisition unit
71 learning unit
72 output unit
101, 102, 102C, 102D first communication apparatus
151 generation device
201, 202, 202E, 202F second communication apparatus
301, 302 communication system
FT1 flag value table
FT2 reconstruction table
PTC, PTD correspondence table

The invention claimed is:

1. An on-vehicle device installed in a vehicle, the on-vehicle device comprising:

a non-transitory computer readable memory; and a hardware processor coupled to the non-transitory computer readable memory and configured to read instructions from the non-transitory computer readable memory to cause the on-vehicle device to perform operations comprising:

acquiring, via a network installed in the vehicle, a plurality of types of status information each indicating a status of the vehicle; and creating, on the basis of each piece of the acquired status information, feature information having a data amount smaller than a total of data amounts of the respective pieces of the status information, the feature information including a feature amount of a traveling status of the vehicle, wherein the creating operation includes:

generating, based on the respective pieces of the status information, intermediate data having a data amount smaller than the total of data amounts of the respective pieces of the status information;

generating, based on the intermediate data, the feature amount having a data amount smaller than the data amount of the intermediate data; and determining which of a plurality of numerical value ranges the feature amount belongs to, and acquiring, as the feature information, a flag value indicating a traveling status of the vehicle corresponding to the numerical value range to which the feature amount belongs, and the feature information is used to create vehicle information to be transmitted to another vehicle.

2. The on-vehicle device according to claim 1, wherein the feature information includes the feature amount of a smaller number of types than the number of types of the respective pieces of the status information.

3. The on-vehicle device according to claim 1, wherein the creating operation comprises creating the feature information by use of a calculation method capable of converting K types of information into less than K types of feature amount, where K is an integer not smaller than 2.

4. The on-vehicle device according to claim 1, wherein the vehicle information is the feature information, and the on-vehicle device further comprises a storing unit configured to store correspondence information indicating a correspondence relationship between a numeral value range of the feature amount and a traveling status of the vehicle, and the correspondence information is transmitted to the other vehicle.

5. The on-vehicle device according to claim 4, wherein the correspondence information is different for each type of the vehicle.

6. An on-vehicle device installed in a vehicle, the on-vehicle device comprising:

a non-transitory computer readable memory; and a hardware processor coupled to the non-transitory computer readable memory and configured to read instructions from the non-transitory computer readable memory to cause the on-vehicle device to perform operations comprising:

receiving feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and determining a traveling status of the vehicle on the basis of the feature information and the correspondence information that have been received, wherein the feature information is a flag value indicating the traveling status of the vehicle corresponding to the numerical value range to which the feature amount belongs, the feature information is generated based on an intermediate data and has a data amount smaller than that of the intermediate data, and the intermediate data is generated based on the respective pieces of the status information and has a data amount smaller than the total of data amounts of the respective pieces of the status information.

7. A communication system comprising:

a first communication apparatus installed in a vehicle; and a second communication apparatus wherein the first communication apparatus comprises:

a first non-transitory computer readable memory; and a first hardware processor coupled to the first non-transitory computer readable memory and configured to read instructions from the first non-transitory computer readable memory to cause the first communication apparatus to perform operations comprising:

generating, based on a plurality of types of status information each indicating a status of the vehicle, intermediate data having a data amount smaller than a total of data amounts of the respective pieces of the status information;

generating, based on the intermediate data, the feature amount of a traveling status of the vehicle having a data amount smaller than the data amount of the intermediate data;

determining which of a plurality of numerical value ranges the feature amount belongs to, and acquiring, as feature information of the traveling status of the vehicle, a flag value indicating a traveling status of the vehicle corresponding to the numerical value range to which the feature amount belongs; and transmitting vehicle information based on the feature information, and the second communication apparatus comprises:

a second non-transitory computer readable memory; and a second hardware processor coupled to the second non-transitory computer readable memory and configured to read instructions from the second non-transitory computer readable memory to cause the second communication apparatus to perform operations comprising receiving the vehicle information transmitted by the first communication apparatus.

8. A non-transitory computer readable storage medium storing a computer program to be used in an on-vehicle device installed in a vehicle, the on-vehicle device comprising a hardware processor configured to execute the computer program to cause the on-vehicle device to perform operations comprising:

acquiring, via a network installed in the vehicle, a plurality of types of status information each indicating a status of the vehicle; and creating, on the basis of each piece of the acquired status information, feature information having a data amount smaller than a total of data amounts of the respective pieces of the status information, the feature information including a feature amount of a traveling status of the vehicle, wherein the creating operation includes:

generating, based on the respective pieces of the status information, intermediate data having a data amount smaller than the total of data amounts of the respective pieces of the status information;

generating, based on the intermediate data, the feature amount having a data amount smaller than the data amount of the intermediate data; and determining which of a plurality of numerical value ranges the feature amount belongs to, and acquiring, as the feature information, a flag value indicating a traveling status of the vehicle corresponding to the numerical value range to which the feature amount belongs, and the feature information is used to create vehicle information to be transmitted to another vehicle.

9. A non-transitory computer readable storage medium storing a computer program to be used in an on-vehicle device installed in a vehicle, the on-vehicle device comprising a hardware processor configured to execute the computer program to cause the on-vehicle device to perform operations comprising:

receiving feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and determining a traveling status of the vehicle on the basis of the feature information and the correspondence information that have been received, wherein the feature information is a flag value indicating the traveling status of the vehicle corresponding to the numerical value range to which the feature amount belongs, the feature information is generated based on an intermediate data and has a data amount smaller than that of the intermediate data, and the intermediate data is generated based on the respective pieces of the status information and has a data amount smaller than the total of data amounts of the respective pieces of the status information.

10. A control method to be used in an on-vehicle device installed in a vehicle, the control method comprising the steps of:

acquiring, via a network installed in the vehicle, a plurality of types of status information each indicating a status of the vehicle; and creating, on the basis of each piece of the acquired status information, feature information having a data amount smaller than a total of data amounts of the respective pieces of the status information, the feature information including a feature amount of a traveling status of the vehicle, wherein the creating step includes:

generating, based on the respective pieces of the status information, intermediate data having a data amount smaller than the total of data amounts of the respective pieces of the status information, generating, based on the intermediate data, the feature amount having a data amount smaller than the data amount of the intermediate data, and determining which of a plurality of numerical value ranges the feature amount belongs to, and acquiring, as the feature information, a flag value indicating a traveling status of the vehicle corresponding to the numerical value range to which the feature amount belongs; and the feature information is used to create vehicle information to be transmitted to another vehicle.

11. A control method to be used in an on-vehicle device installed in a vehicle, the control method comprising the steps of:

receiving feature information having a data amount smaller than a total of data amounts of a plurality of types of status information each indicating a status of the vehicle, the feature information including a feature amount of a traveling status of the vehicle, and correspondence information indicating a correspondence relationship between a numeral value range of the feature amount and a traveling status of the vehicle; and determining a traveling status of the vehicle on the basis of the feature information and the correspondence information that have been received, wherein the feature information is a flag value indicating the traveling status of the vehicle corresponding to the numerical value range to which the feature amount belongs, the feature information is generated based on an intermediate data and has a data amount smaller than that of the intermediate data, and the intermediate data is generated based on the respective pieces of the status information and has a data amount smaller than the total of data amounts of the respective pieces of the status information.

* * * * *